(12) United States Patent
Lim

(10) Patent No.: US 11,855,531 B2
(45) Date of Patent: Dec. 26, 2023

(54) HYBRID POWER CONVERTER

(71) Applicant: Cirrus Logic International Semiconductor Ltd., Edinburgh (GB)

(72) Inventor: Changjong Lim, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 159 days.

(21) Appl. No.: 17/582,836

(22) Filed: Jan. 24, 2022

(65) Prior Publication Data

US 2023/0238887 A1    Jul. 27, 2023

(51) Int. Cl.
    *H02M 3/07*     (2006.01)
    *H02M 1/00*     (2006.01)

(52) U.S. Cl.
    CPC ........... *H02M 3/07* (2013.01); *H02M 1/0095* (2021.05)

(58) Field of Classification Search
    CPC ............ H02M 1/0095; H02M 3/07–078
    See application file for complete search history.

(56) References Cited

U.S. PATENT DOCUMENTS

| | | | |
|---|---|---|---|
| 10,075,080 B1 | 9/2018 | Scoones et al. | |
| 10,468,988 B2 | 11/2019 | Scoones et al. | |
| 10,476,390 B2 | 11/2019 | Petersen | |
| 10,615,697 B1 | 4/2020 | Ferrari et al. | |
| 10,651,736 B1 * | 5/2020 | Lazaro | H02M 7/4837 |
| 11,101,735 B2 | 8/2021 | Scoones et al. | |
| 2020/0144909 A1 | 5/2020 | Baek et al. | |

FOREIGN PATENT DOCUMENTS

EP     3726715 A1 *    10/2020      ............. G01R 31/40

OTHER PUBLICATIONS

International Search Report and Written Opinion of the International Searching Authority, International Application No. PCT/GB2022/053190, dated Mar. 10, 2023.

\* cited by examiner

*Primary Examiner* — Peter M Novak
(74) *Attorney, Agent, or Firm* — Jackson Walker L.L.P

(57) ABSTRACT

A power converter for converting an input voltage at an input of the power converter into an output voltage at an output of the power converter may include a switching node, a power inductor coupled between the switching node and the output, a flying capacitor having a first flying capacitor terminal and a second flying capacitor terminal, a pump capacitor having a first pump capacitor terminal and a second pump capacitor terminal, the second pump capacitor terminal coupled to ground, a first switch coupled between the input and the first flying capacitor terminal, a second switch coupled between the first flying capacitor terminal and the switching node, a third switch coupled between the second flying capacitor terminal and the switching node, a fourth switch coupled between the second flying capacitor terminal and a ground voltage, a fifth switch coupled between the second flying capacitor terminal and the first pump capacitor terminal, and a sixth switch coupled between the output and the first pump capacitor terminal.

34 Claims, 15 Drawing Sheets

HYBRID POWER CONVERTER

FIELD OF DISCLOSURE

The present disclosure relates in general to circuits for electronic devices, including without limitation personal audio devices such as wireless telephones and media players, and more specifically, to a hybrid buck-boost power converter implemented in a 3-level buck-boost topology that enables the hybrid power converter to operate in a plurality of operating modes. In particular, the hybrid power converter disclosed herein supports operation in both buck modes of operation and boost modes of operation, rendering it suitable not only for battery charging in applications that typically employ single-series-cell batteries (e.g., mobile phones and other small portable devices), but also for applications that typically employ multiple-series-cell batteries (e.g., notebook computers).

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

One type of power converter often used in electronic circuits is a hybrid 3-level buck-boost converter. FIG. 1 depicts an example hybrid 3-level buck-boost converter 100, as is known in the art. As shown in FIG. 1, hybrid 3-level buck-boost converter 100 may include an input configured to receive an input voltage $V_{IN}$ and an output configured to generate an output voltage $V_{OUT}$. Further, hybrid 3-level buck-boost converter 100 may include a switching node having a voltage $L_x$. Hybrid 3-level buck-boost converter 100 may include a power inductor 102 coupled between the switching node and the output. Moreover, hybrid 3-level buck-boost converter 100 may include a flying capacitor 104 having a first capacitor terminal and a second capacitor terminal. In addition, hybrid 3-level buck-boost converter 100 may include a plurality of switches 106a, 106b, 106c, 106d, and 106e, wherein switch 106a is coupled between the input and the first capacitor terminal, switch 106b is coupled between the first capacitor terminal and the switching node, switch 106c is coupled between the second capacitor terminal and the switching node, switch 106d is coupled between the second capacitor terminal and a ground voltage, and switch 106e is coupled between the second capacitor terminal and the input.

In operation, switches 106a, 106b, 106c, 106d, and 106e may be controlled to regulate output voltage $V_{OUT}$ to a desired target voltage. Depending on input voltage $V_{IN}$ and the desired target voltage, hybrid 3-level buck-boost converter 100 may be operated in either a buck mode ($V_{OUT}<V_{IN}$) or a boost mode ($V_{OUT}>V_{IN}$). In the boost mode, switches 106a, 106d, and 106e may be controlled to regulate output voltage $V_{OUT}$, while switch 106b may be left activated and switch 106c may be left deactivated. Hybrid 3-level buck-boost converter 100 may periodically cycle between a first phase in which switches 106a and 106d may be activated (and switch 106e deactivated) and a second phase in which switch 106e may be activated (and switches 106a and 106d deactivated). In essence, boost mode operation is similar to operation of a charge-pump (e.g., voltage doubler), as in the phases of boost operation, voltage $L_x$ may vary between $V_{IN}$ and $2V_{IN}$. Thus, through boost operation, output voltage $V_{OUT}$ can be regulated up to $2V_{IN}$.

However, situations may exist in which it may be desirable to regulate output voltage $V_{OUT}$ to a voltage above $2V_{IN}$, which is not possible with the topology shown in FIG. 1.

SUMMARY

In accordance with the teachings of the present disclosure, one or more disadvantages and problems associated with existing topologies for hybrid 3-level buck-boost converters may be reduced or eliminated.

In accordance with embodiments of the present disclosure, a power converter for converting an input voltage at an input of the power converter into an output voltage at an output of the power converter may include a switching node, a power inductor coupled between the switching node and the output, a flying capacitor having a first flying capacitor terminal and a second flying capacitor terminal, a pump capacitor having a first pump capacitor terminal and a second pump capacitor terminal, the second pump capacitor terminal coupled to ground, a first switch coupled between the input and the first flying capacitor terminal, a second switch coupled between the first flying capacitor terminal and the switching node, a third switch coupled between the second flying capacitor terminal and the switching node, a fourth switch coupled between the second flying capacitor terminal and a ground voltage, a fifth switch coupled between the second flying capacitor terminal and the first pump capacitor terminal, and a sixth switch coupled between the output and the first pump capacitor terminal.

In accordance with these and other embodiments of the present disclosure, a method for converting an input voltage at an input of the power converter into an output voltage at an output of the power converter, is provided for a power converter comprising a switching node, a power inductor coupled between the switching node and the output, a flying capacitor having a first flying capacitor terminal and a second flying capacitor terminal, a pump capacitor having a first pump capacitor terminal and a second pump capacitor terminal, the second pump capacitor terminal coupled to ground, a first switch coupled between the input and the first flying capacitor terminal, a second switch coupled between the first flying capacitor terminal and the switching node, a third switch coupled between the second flying capacitor terminal and the switching node, a fourth switch coupled between the second flying capacitor terminal and a ground voltage, a fifth switch coupled between the second flying capacitor terminal and the first pump capacitor terminal, and a sixth switch coupled between the output and the first pump capacitor terminal. The method may include operating the power converter in a forward hybrid boost mode having two sequential phases comprising a first forward hybrid boost phase in which the first switch, the second switch, the fourth switch, and the sixth switch are activated and the third switch and the fifth switch are deactivated and a second forward hybrid boost phase in which the second switch and the fifth switch are activated and the first switch, the third switch, the fourth switch, and the sixth switch are deactivated.

In accordance with these and other embodiments of the present disclosure, an integrated circuit for use in a power converter for converting an input voltage at an input of the integrated circuit into an output voltage at an output of the power converter may include a switching node, a first switch coupled between the input and a first node configured to couple to a first flying capacitor terminal of a flying capacitor, a second switch coupled between the first node and the switching node, a third switch coupled between the switching node and a second node configured to couple to a second flying capacitor terminal of the flying capacitor, a fourth switch coupled between the second node and a third node at a ground voltage, a fifth switch coupled between the second node and a fourth node configured to couple to a first pump capacitor terminal of a pump capacitor coupled to a ground voltage at a second pump capacitor terminal, and a sixth switch coupled between the output and the fourth node.

In accordance with these and other embodiments of the present disclosure, a power converter system may include a power converter branch comprising a flying capacitor and a switch network configured to convert an input voltage of the power converter system into an output voltage of the power converter system and an auxiliary branch comprising an auxiliary capacitor coupled to ground voltage and a second switch network, the auxiliary branch configured to operate in a plurality of modes comprising a first mode in which the auxiliary capacitor is used to charge balance the flying capacitor and a second mode in which the auxiliary capacitor is used to boost an output of the power converter branch.

In accordance with these and other embodiments of the present disclosure, a method may include, in a power converter system having a power converter branch comprising a flying capacitor and a switch network configured to convert an input voltage of the power converter system into an output voltage of the power converter system and an auxiliary branch comprising an auxiliary capacitor coupled to ground voltage and a second switch network, operating the auxiliary branch in a plurality of modes comprising a first mode in which the auxiliary capacitor is used to charge balance the flying capacitor and a second mode in which the auxiliary capacitor is used to boost an output of the power converter branch.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 2:
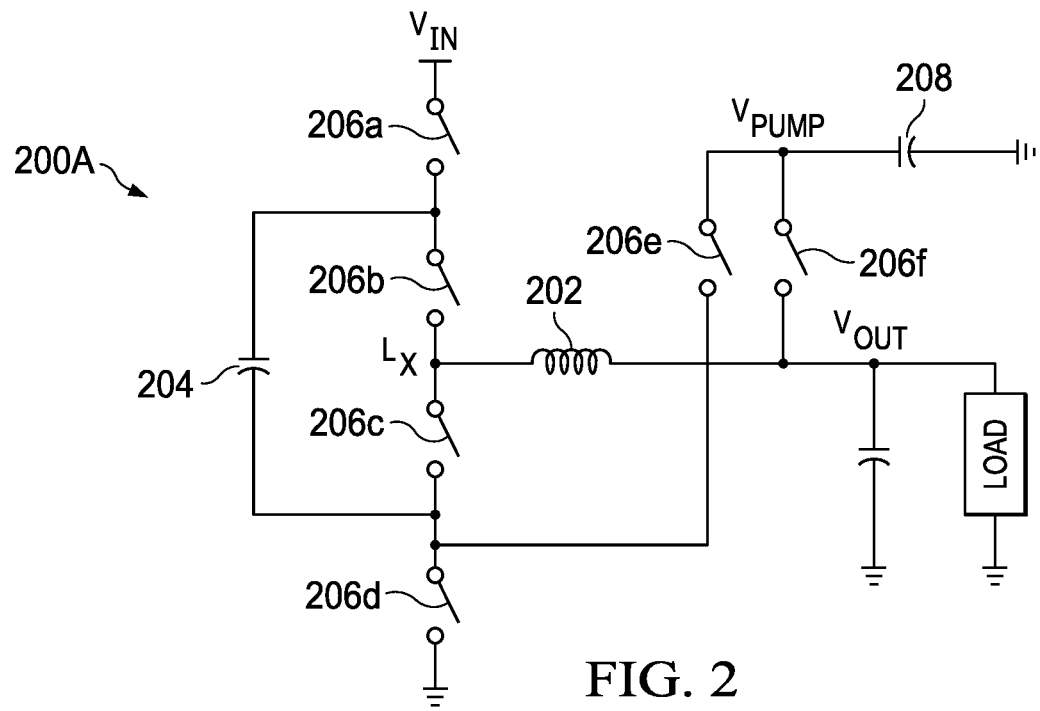
FIG. 2 illustrates a circuit diagram of selected components of an example hybrid 3-level buck-boost converter, in accordance with embodiments of the present disclosure.

FIG. 2 illustrates a circuit diagram of selected components of an example hybrid 3-level buck-boost converter 200A, in accordance with embodiments of the present disclosure. As shown in FIG. 2, hybrid 3-level buck-boost converter 200A may include an input configured to receive an input voltage $V_{IN}$ and an output configured to generate an output voltage $V_{OUT}$. Further, hybrid 3-level buck-boost converter 200A may include a switching node having a voltage $L_x$. Hybrid 3-level buck-boost converter 200A may also include a power inductor 202 coupled between the switching node and the output. Moreover, hybrid 3-level buck-boost converter 200A may include a flying capacitor 204 having a first flying capacitor terminal and a second flying capacitor terminal and a pump capacitor 208 having a first pump capacitor terminal and a second pump capacitor terminal, wherein the second pump capacitor terminal may be coupled to ground. In addition, hybrid 3-level buck-boost converter 200A may include a plurality of switches 206a, 206b, 206c, 206d, 206e, and 206f, wherein switch 206a is coupled between the input and the first flying capacitor terminal, switch 206b is coupled between the first flying capacitor terminal and the switching node, switch 206c is coupled between the second flying capacitor terminal and the switching node, switch 206d is coupled between the second flying capacitor terminal and a ground voltage, switch 206e is coupled between the second flying capacitor terminal and the first pump capacitor terminal, and switch 206f is coupled between the output and the first pump capacitor terminal.

In operation, a control circuit (not shown for purposes of clarity and exposition) may control switching of switches 206a, 206b, 206c, 206d, 206e, and 206f to regulate output voltage $V_{OUT}$ to a desired target voltage. To that end, the control circuit may cause hybrid 3-level buck-boost converter 200A to operate, at any given time, in one of a plurality of modes, as depicted in FIGS. 3-8, and described in greater detail below.

Figure 1:
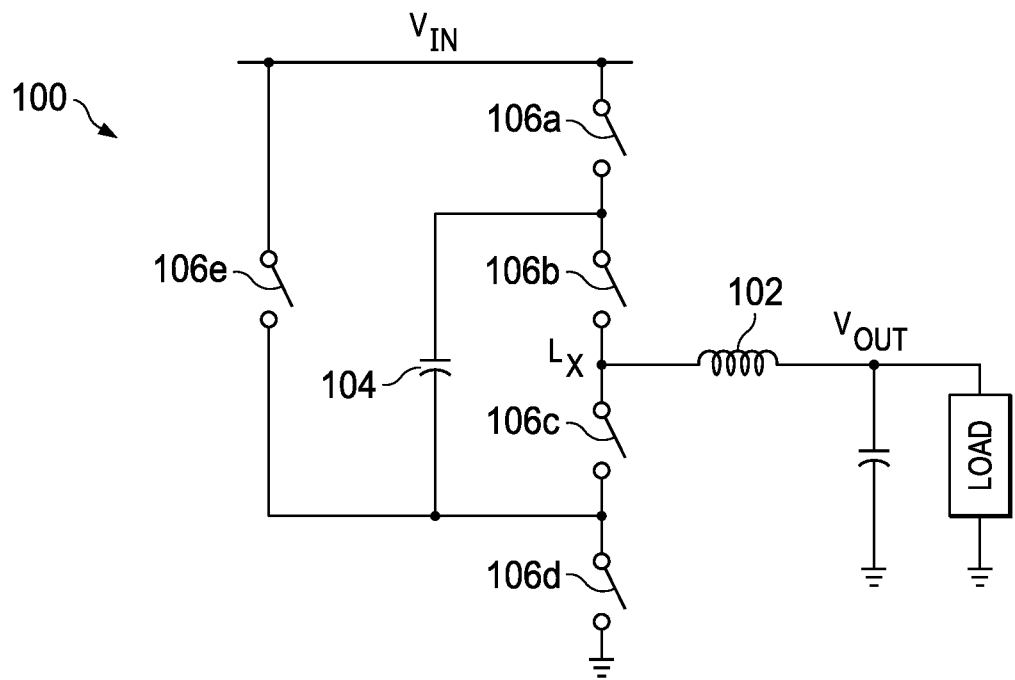
FIG. 1 illustrates a circuit diagram of selected components of an example hybrid 3-level buck-boost converter, as is known in the art.
Figure 3:
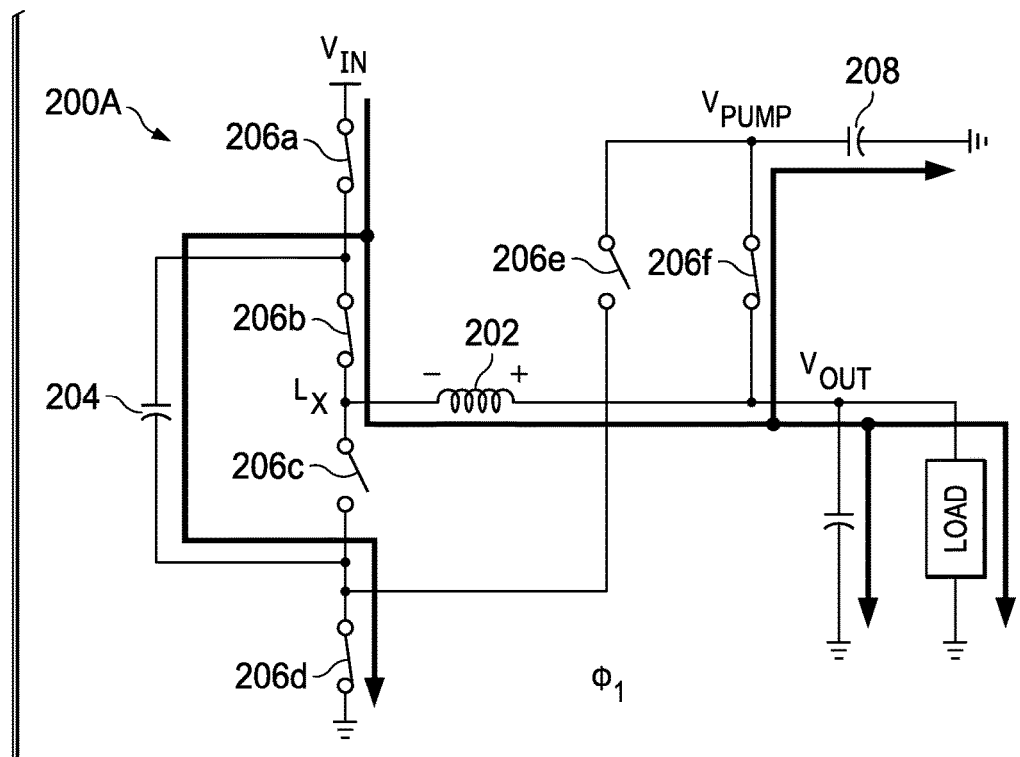
FIG. 3 illustrates operation of the hybrid 3-level buck-boost converter depicted in FIG. 2 in a forward hybrid boost mode, in accordance with embodiments of the present disclosure.
Figure 3:
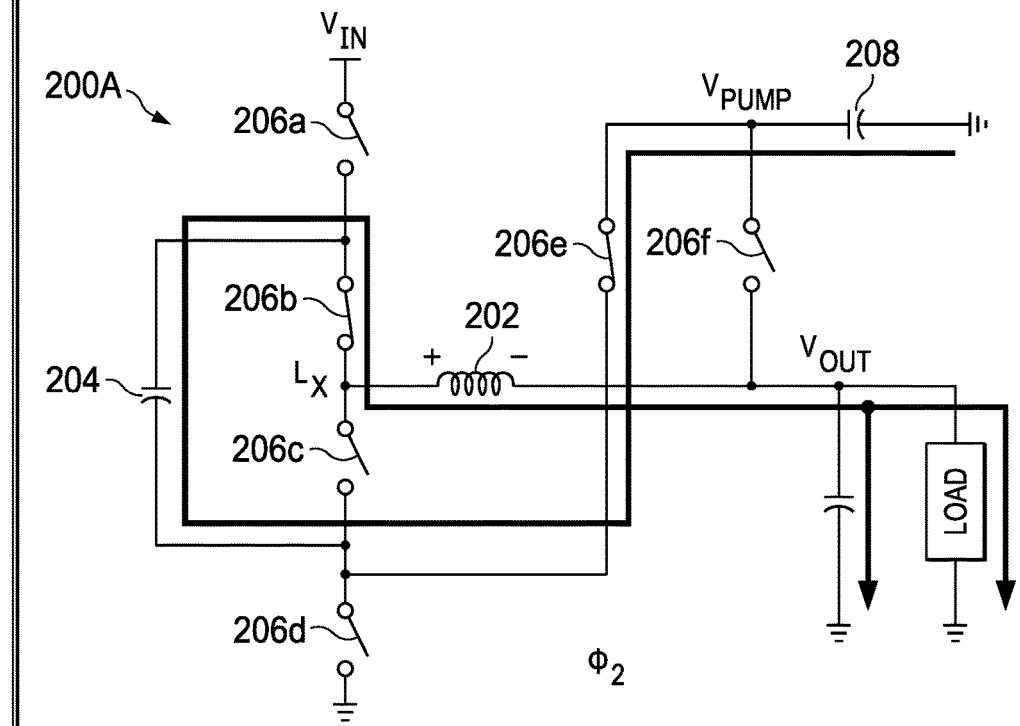

Perhaps most advantageously over the existing topology shown in FIG. 1, hybrid 3-level buck-boost converter 200A may be operated in a forward hybrid boost mode, depicted in FIG. 3, which enables regulation of output voltage $V_{OUT}$ to a desired target voltage greater than $2V_{IN}$. As shown in FIG. 3, operation in the forward hybrid boost mode may include commutation of switches between a first phase ($\varphi 1$) and a second phase ($\varphi 2$). Switch 206b may remain activated and switch 206c may remain deactivated during both the first phase and the second phase, and switches 206a, 206d, 206e, and 206f may be commutated to regulate output voltage $V_{OUT}$, with switches 206a and 206d activated (and switch 206e deactivated) during the first phase, and switch 206e activated (and switches 206a, 206d, and 206f deactivated) during the second phase. During the first phase, a voltage $V_{PUMP}$ across pump capacitor 208 may be charged to output voltage $V_{OUT}$, allowing the switching node voltage $L_x$ to switch between $V_{IN}$ and $V_{OUT}+V_{IN}$. Accordingly, output voltage $V_{OUT}$ is not limited to $2V_{IN}$, and may be set to a desired target voltage greater than $2V_{IN}$. Notably, by swapping the input and output of hybrid 3-level buck-boost converter 200A, hybrid 3-level buck-boost converter 200A may operate the same two phases depicted in FIG. 3 in order to operate in a reverse hybrid buck mode.

Figure 4:
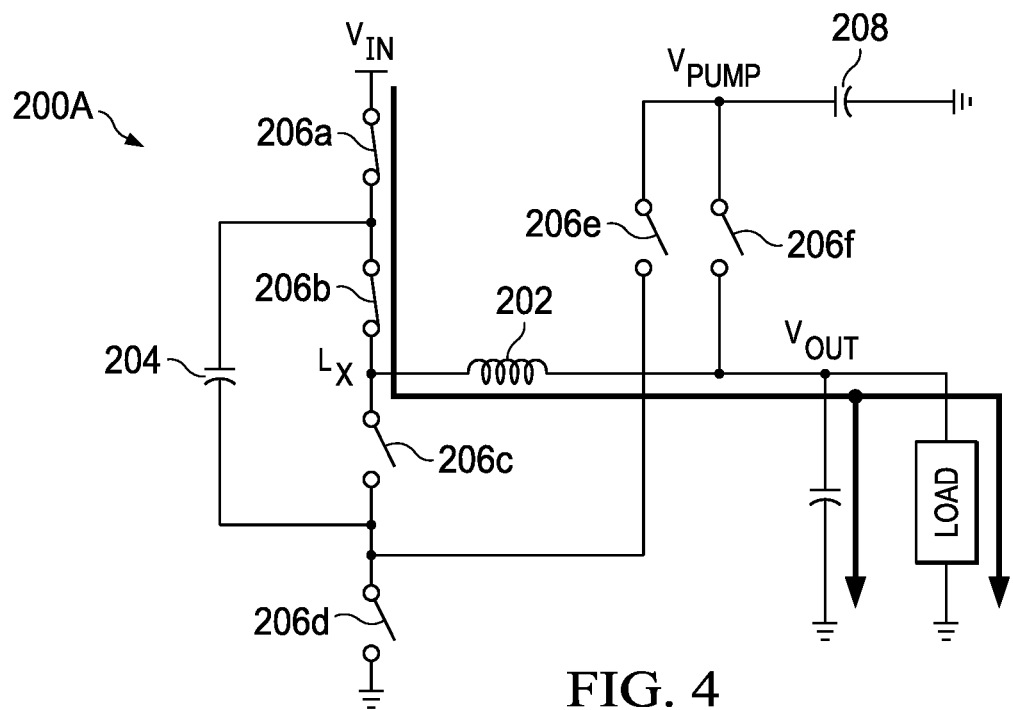
FIG. 4 illustrates operation of the hybrid 3-level buck-boost converter depicted in FIG. 2 in a bypass mode, in accordance with embodiments of the present disclosure.

In addition, hybrid 3-level buck-boost converter 200A may be operated in a bypass mode, depicted in FIG. 4, which bypasses input voltage $V_{IN}$ to output voltage $V_{OUT}$. Accordingly, through the entirety of operation in bypass mode, switches 206a and 206b may remain activated, such that input voltage $V_{IN}$ passes to output voltage $V_{OUT}$ via switches 206a and 206b and power inductor 202. In some embodiments, switches 206c, 206e, and 206f may also be activated in addition to or in lieu of switches 206a and 206b, in order to reduce losses that may occur due to the resistance of power inductor 202.

Figure 5:
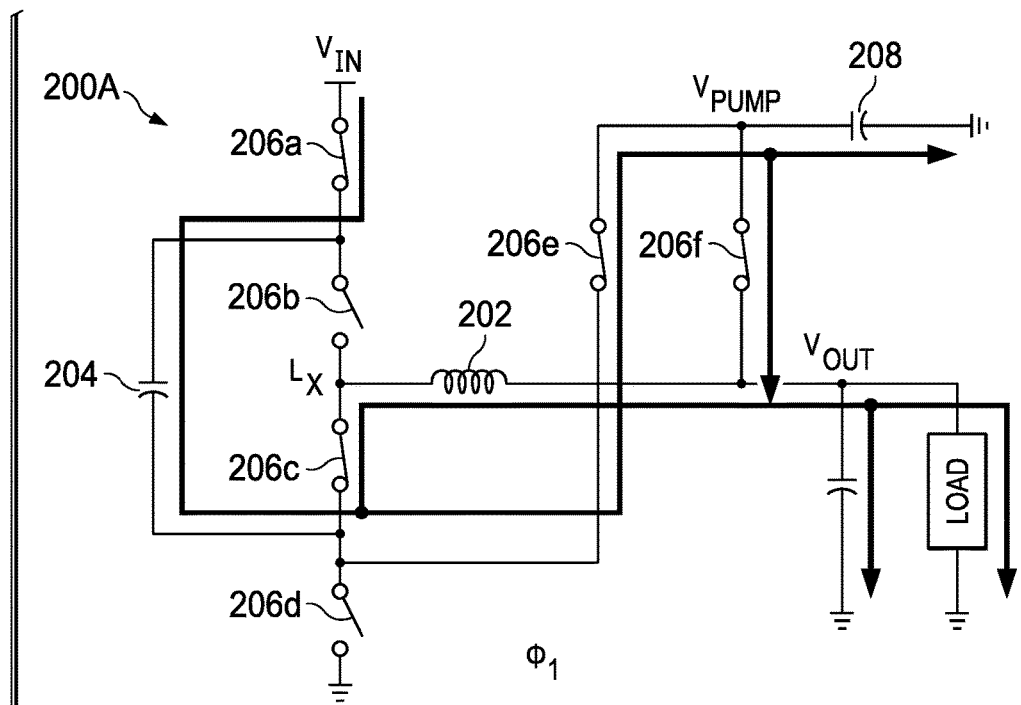
FIG. 5 illustrates operation of the hybrid 3-level buck-boost converter depicted in FIG. 2 in a forward 2:1 switched capacitor mode, in accordance with embodiments of the present disclosure.
Figure 5:
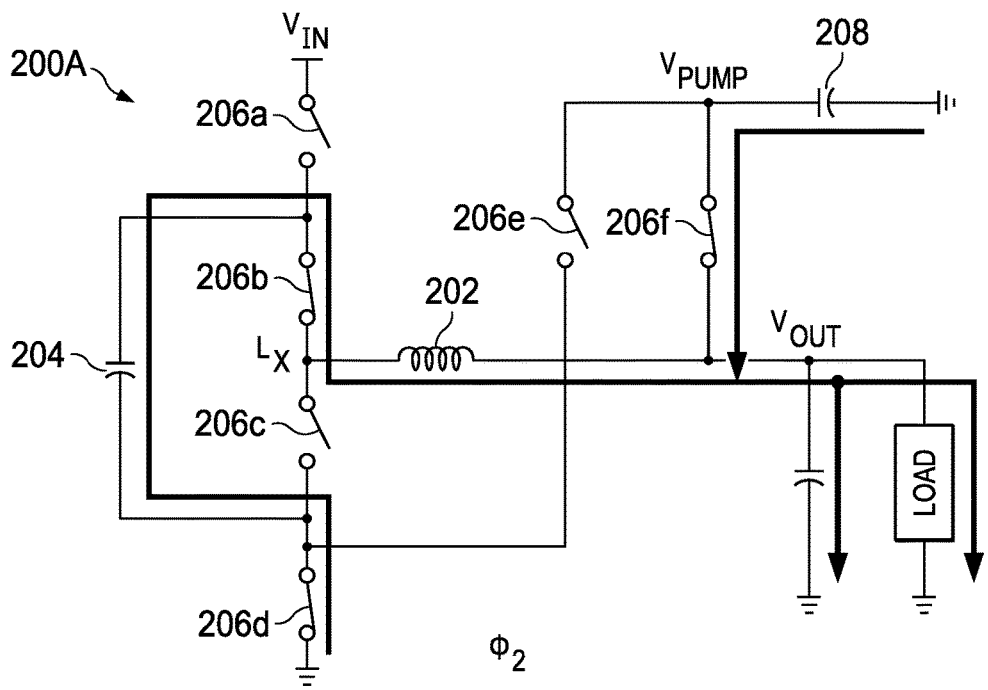

Further, hybrid 3-level buck-boost converter 200A may be operated in a forward 2:1 switched capacitor mode, depicted in FIG. 5, which may enable regulation of output voltage $V_{OUT}$ to $2V_{IN}$. As shown in FIG. 5, operation in the forward 2:1 switched capacitor mode may include commutation of switches between a first phase ($\varphi 1$) and a second phase ($\varphi 2$). Switch 206f may remain activated during both the first phase and the second phase, and switches 206a, 206b, 206c, 206d, and 206e may be commutated to regulate output voltage $V_{OUT}$, with switches 206a, 206c, and 206e activated (and switches 206b and 206d deactivated) during the first phase, and switches 206b and 206d activated (and switches 206a, 206c, and 206e deactivated) during the second phase.

Figure 6:
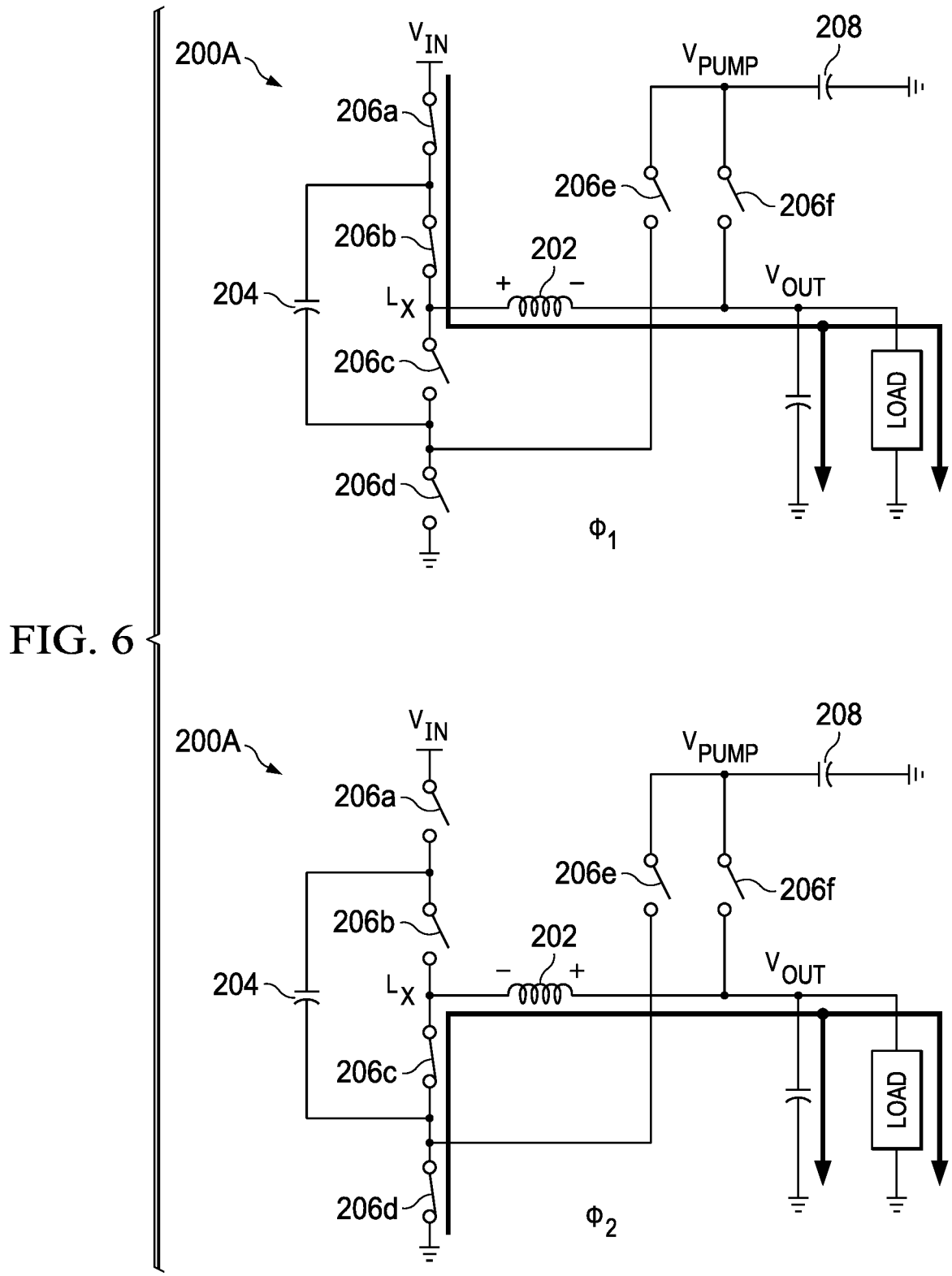
FIG. 6 illustrates operation of the hybrid 3-level buck-boost converter depicted in FIG. 2 in a forward 2-level buck mode, in accordance with embodiments of the present disclosure.

Moreover, hybrid 3-level buck-boost converter 200A may be operated in a forward 2-level buck mode, depicted in FIG. 6. As shown in FIG. 6, operation in the forward 2-level buck mode may include commutation of switches between a first phase ($\varphi 1$) and a second phase ($\varphi 2$). Switches 206e and 206f may remain deactivated during both the first phase and the second phase, and switches 206a, 206b, 206c, and 206d may be commutated to regulate output voltage $V_{OUT}$, with switches 206a and 206b activated (and one or both of switches 206c and 206d deactivated) during the first phase, and switches 206c and 206d activated (and one or both switches 206a and 206b deactivated) during the second phase. Notably, by swapping the input and output of hybrid 3-level buck-boost converter 200A, hybrid 3-level buck-boost converter 200A may operate the same two phases depicted in FIG. 6 in order to operate in a reverse 2-level boost mode.

Figure 7:
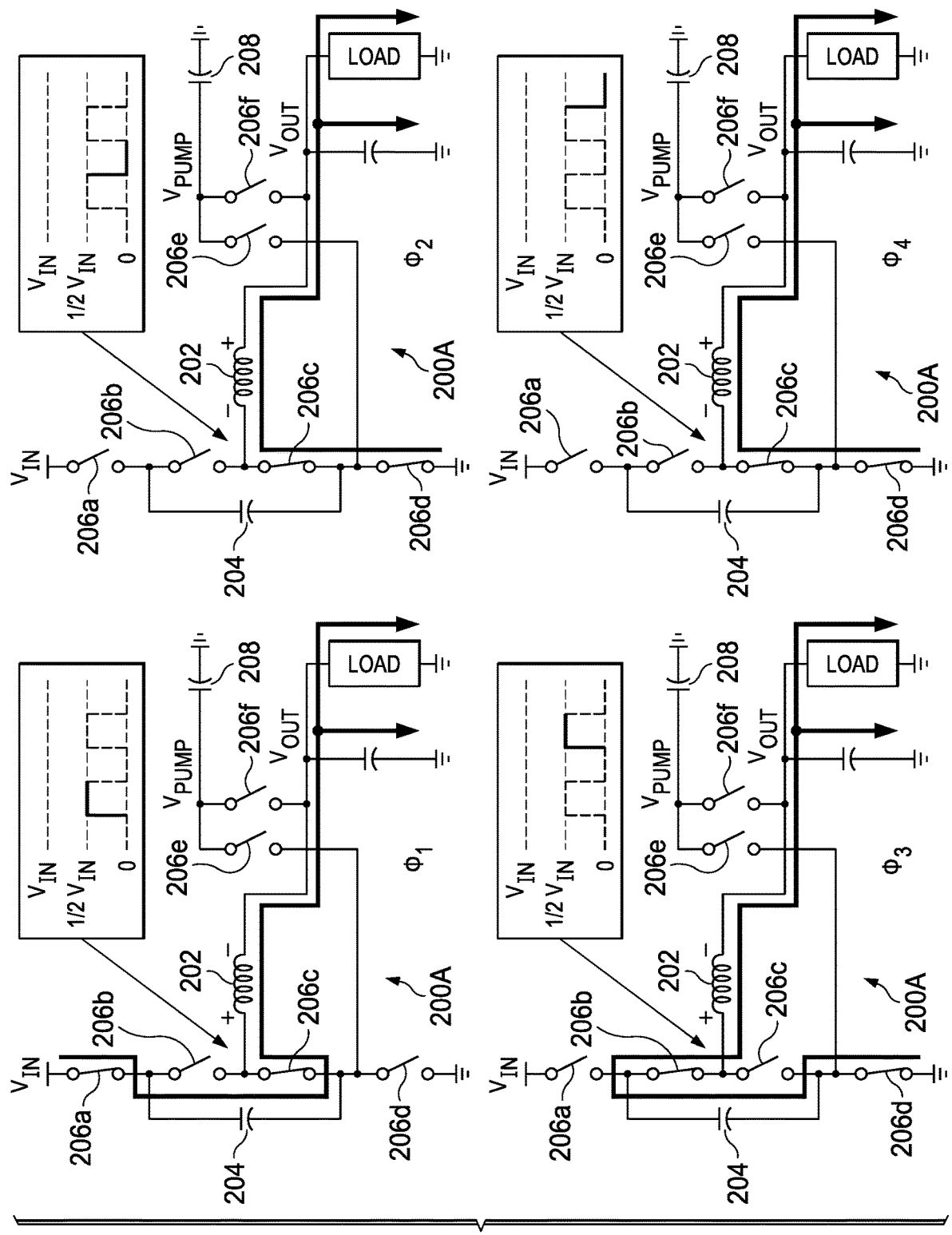
FIG. 7 illustrates operation of the hybrid 3-level buck-boost converter depicted in FIG. 2 in a forward 3-level buck mode for duty cycles less than 0.5, in accordance with embodiments of the present disclosure.
Figure 8:
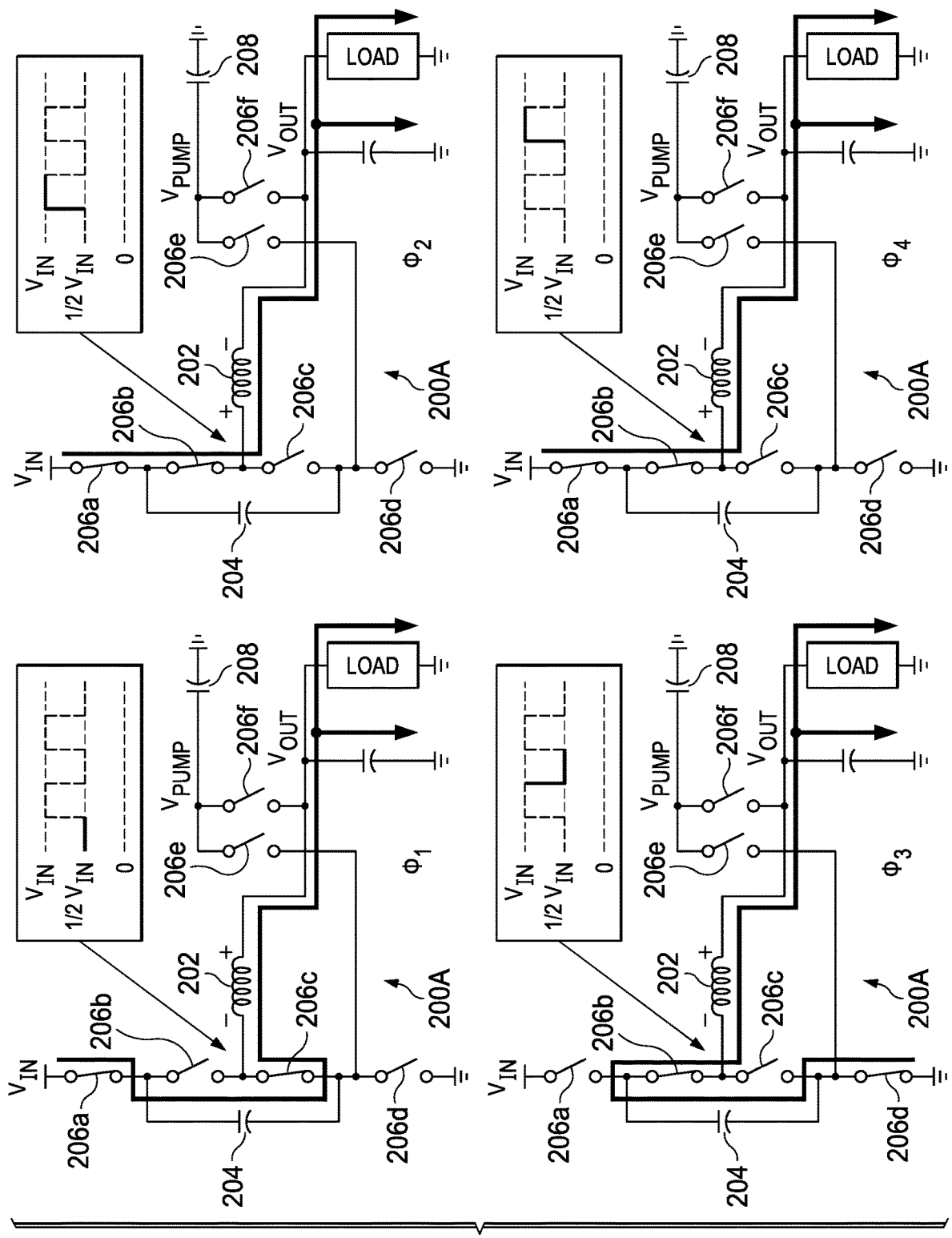
FIG. 8 illustrates operation of the hybrid 3-level buck-boost converter depicted in FIG. 2 in a forward 3-level buck mode for duty cycles greater than 0.5, in accordance with embodiments of the present disclosure.

Hybrid 3-level buck-boost converter 200A may also be operated in a forward 3-level buck mode, depicted in FIGS. 7 and 8. As shown in FIG. 7, for duty cycles of less than 0.5, operation in the forward 3-level buck mode may include commutation of switches among a first phase ($\varphi 1$), a second phase ($\varphi 2$), a third phase ($\varphi 3$), and a fourth phase ($\varphi 4$). Switches 206e and 206f may remain deactivated during all four phases, and switches 206a, 206b, 206c, 206d may be commutated to regulate output voltage $V_{OUT}$, with switches 206a and 206c activated (and switches 206b and 206d deactivated) during the first phase, switches 206c and 206d activated (and switches 206a and 206b deactivated) during the second phase, switches 206b and 206d activated (and switches 206a and 206c deactivated) during the third phase, and switches 206c and 206d activated (and switches 206a and 206b deactivated) during the fourth phase. Further, as shown in FIG. 8, for duty cycles of greater than 0.5, operation in the forward 3-level buck mode may include commutation of switches among a first phase ($\varphi 1$), a second phase (φ2), a third phase (φ3), and a fourth phase (φ4). Switches 206e and 206f may remain deactivated during all four phases, and switches 206a, 206b, 206c, and 206d may be commutated to regulate output voltage $V_{OUT}$, with switches 206a and 206c activated (and switches 206b and 206d deactivated) during the first phase, switches 206a and 206b activated (and switches 206c and 206d deactivated) during the second phase, switches 206b and 206d activated (and switches 206a and 206c deactivated) during the third phase, and switches 206a and 206b activated (and switches 206c and 206d deactivated) during the fourth phase. Notably, by swapping the input and output of hybrid 3-level buck-boost converter 200A, hybrid 3-level buck-boost converter 200A may operate the same four phases depicted in FIGS. 7 and 8 in order to operate in a reverse 3-level boost mode.

Figure 9:
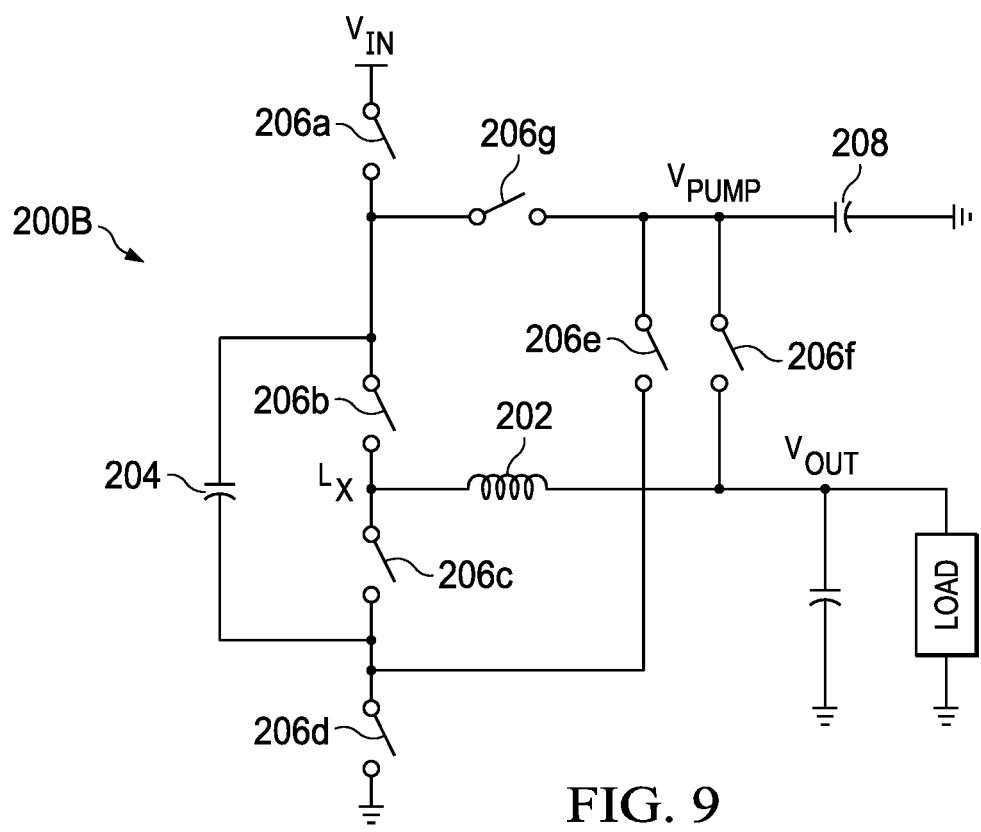
FIG. 9 illustrates a circuit diagram of selected components of another example hybrid 3-level buck-boost converter, in accordance with embodiments of the present disclosure.

FIG. 9 illustrates a circuit diagram of selected components of another example hybrid 3-level buck-boost converter 200B, in accordance with embodiments of the present disclosure. Hybrid 3-level buck-boost converter 200B may be similar in many respects to hybrid 3-level buck-boost converter 200A depicted in FIG. 2, except that in addition to those components depicted in FIG. 2, hybrid 3-level buck-boost converter 200B may include a switch 206g coupled between the first flying capacitor terminal and the first pump capacitor terminal. In operation, a control circuit (not shown for purposes of clarity and exposition) may control switching of switches 206a, 206b, 206c, 206d, 206e, 206f, and 206g to regulate output voltage $V_{OUT}$ to a desired target voltage. To that end, the control circuit may cause hybrid 3-level buck-boost converter 200B to operate, at any given time, in one of a plurality of modes, similar to those modes depicted in FIGS. 3-8, and described in greater detail below with reference to FIGS. 10-15.

Figure 10:
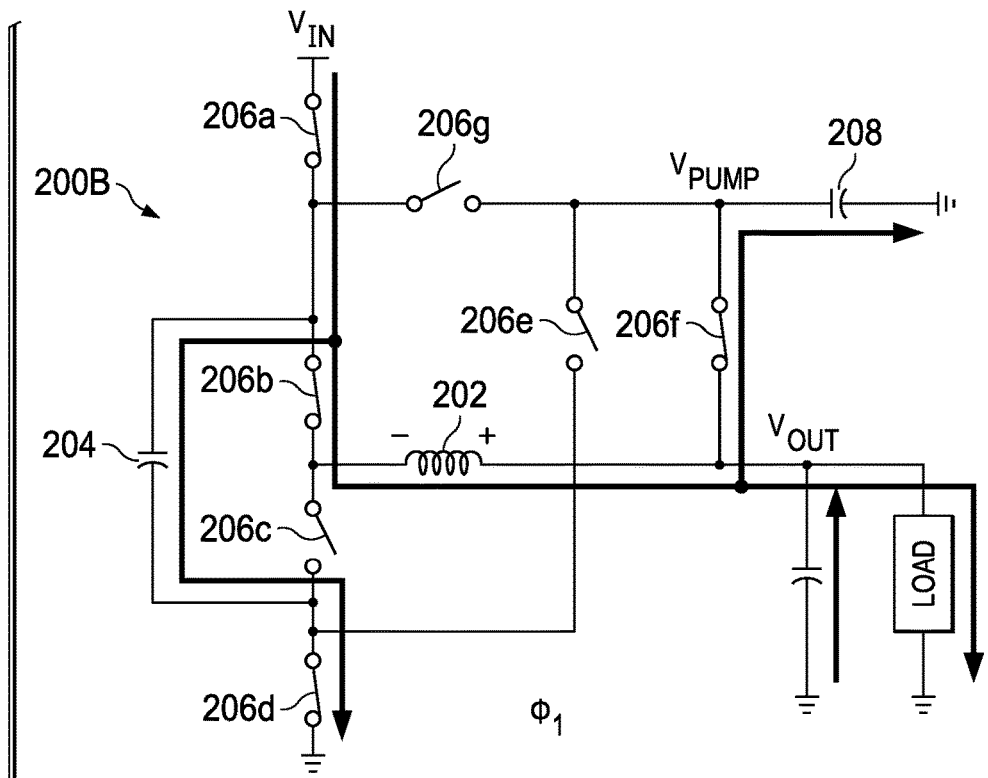
FIG. 10 illustrates operation of the hybrid 3-level buck-boost converter depicted in FIG. 9 in a forward hybrid boost mode, in accordance with embodiments of the present disclosure.
Figure 10:
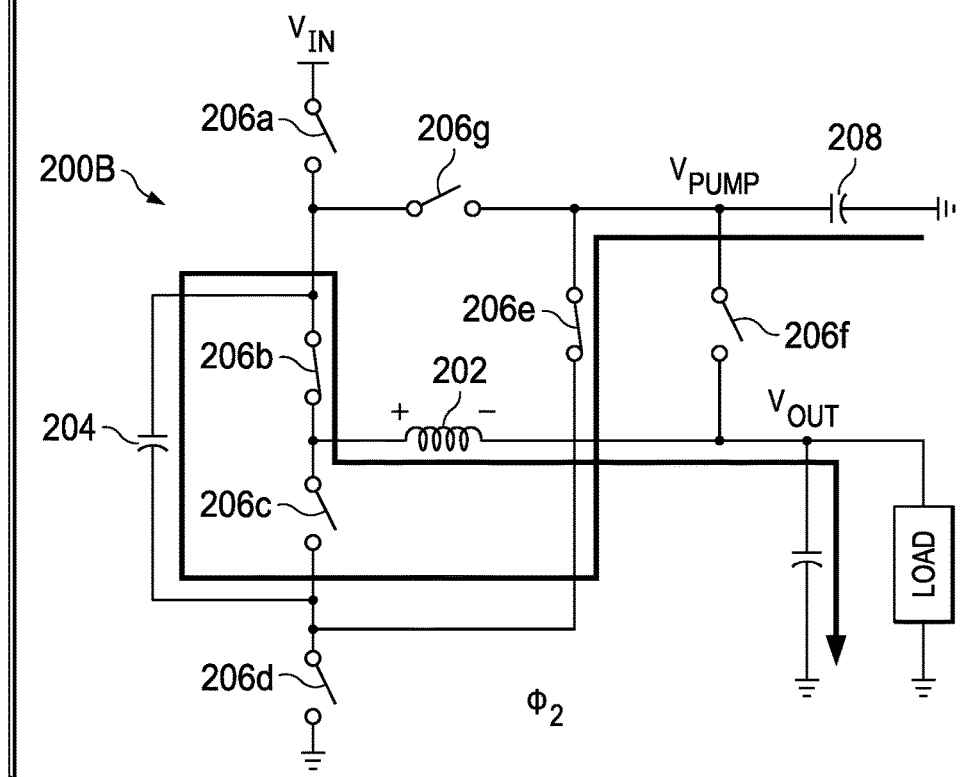

Similar to that depicted in FIG. 3, hybrid 3-level buck-boost converter 200B may operate in a forward hybrid boost mode, depicted in FIG. 10, which enables regulation of output voltage $V_{OUT}$ to a desired target voltage greater than $2V_{IN}$. As shown in FIG. 10, operation of hybrid 3-level buck-boost converter 200B in the forward hybrid boost mode may be similar to operation of hybrid 3-level buck-boost converter 200A in the forward hybrid boost mode, except that in the case of hybrid 3-level buck-boost converter 200B, switch 206g may remain deactivated during both the first phase and the second phase. Notably, by swapping the input and output of hybrid 3-level buck-boost converter 200B, hybrid 3-level buck-boost converter 200B may operate the same two phases depicted in FIG. 10 in order to operate in a reverse hybrid buck mode.

Figure 11:
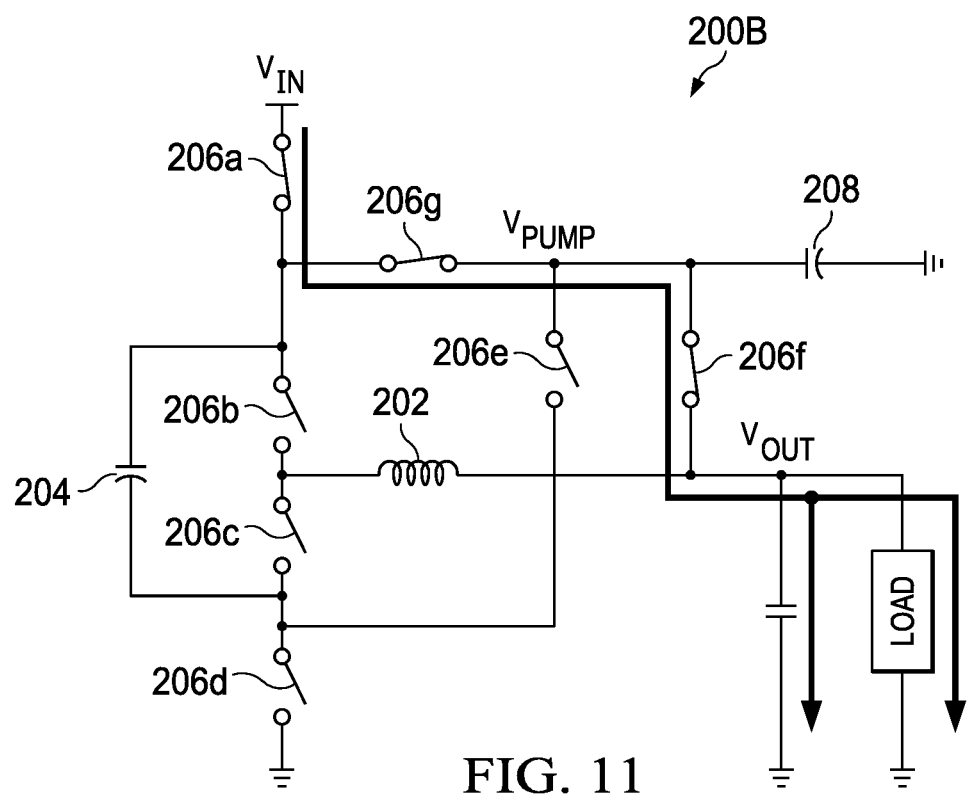
FIG. 11 illustrates operation of the hybrid 3-level buck-boost converter depicted in FIG. 9 in a bypass mode, in accordance with embodiments of the present disclosure.

In addition, similar to that depicted in FIG. 4, hybrid 3-level buck-boost converter 200B may be operated in a bypass mode, depicted in FIG. 11, which bypasses input voltage $V_{IN}$ to output voltage $V_{OUT}$. Accordingly, through the entirety of operation in bypass mode, switches 206a, 206g, and 206f may remain activated, such that input voltage $V_{IN}$ passes to output voltage $V_{OUT}$ via switches 206a, 206g, and 206f. In some cases, operation of hybrid 3-level buck-boost converter 200B in the bypass mode may be preferable to operation of hybrid 3-level buck-boost converter 200A in the bypass mode, in that bypassing through power inductor 202 as shown in FIG. 3 may lead to losses (e.g., due to DC resistance of power inductor 202) that may not occur when power inductor 202 is bypassed as shown in FIG. 11. In some embodiments, switches 206b, 206c, and 206e may also be activated in addition to switches 206a, 206g, and 206f, in order to further minimize losses that may occur due to resistances of switches 206a, 206g, and 206f.

Figure 12:
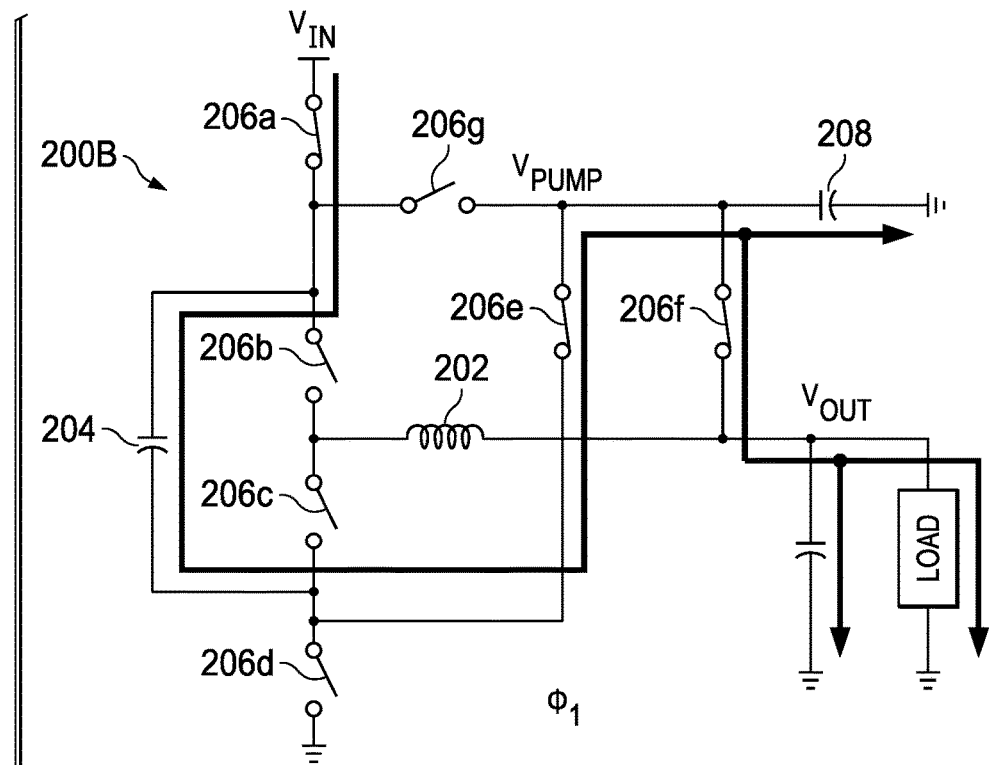
FIG. 12 illustrates operation of the hybrid 3-level buck-boost converter depicted in FIG. 9 in a forward 2:1 switched capacitor mode, in accordance with embodiments of the present disclosure.
Figure 12:
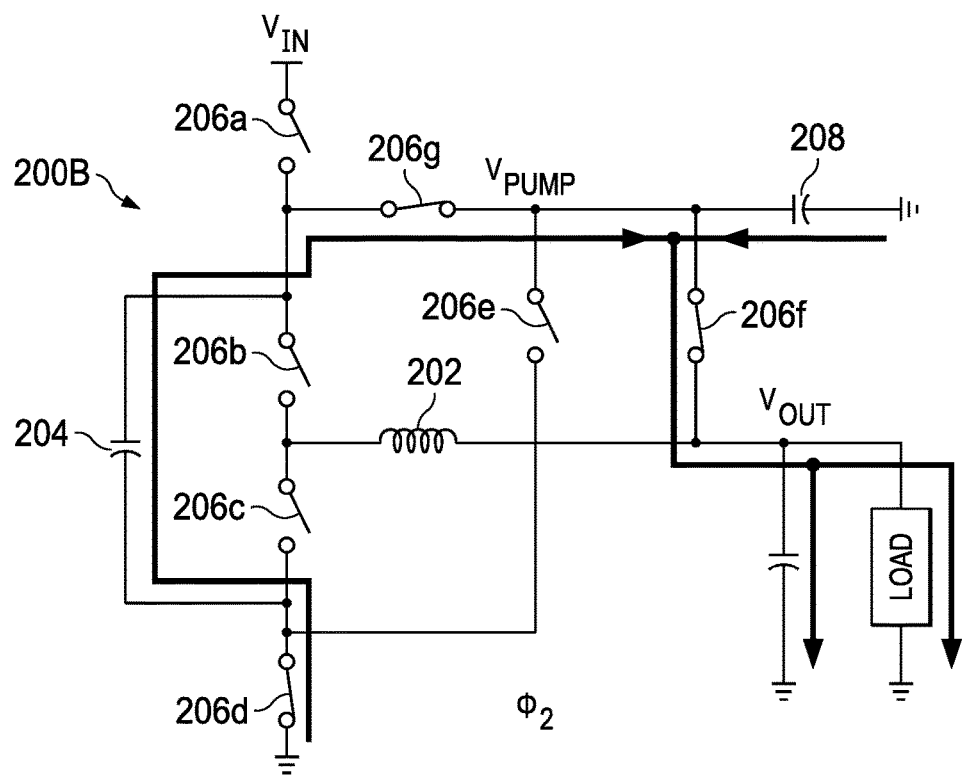

Further, similar to that depicted in FIG. 5, hybrid 3-level buck-boost converter 200B may be operated in a forward 2:1 switched capacitor mode, depicted in FIG. 12, which may enable regulation of output voltage $V_{OUT}$ to $2V_{IN}$. As shown in FIG. 12, operation in the forward 2:1 switched capacitor mode may include commutation of switches between a first phase (φ1) and a second phase (φ2). Switch 206f may remain activated and switches 206b and 206c may remain deactivated during both the first phase and the second phase, and switches 206a, 206d, 206e, and 206g may be commutated to regulate output voltage $V_{OUT}$, with switches 206a and 206e activated (and switches 206d and 206g deactivated) during the first phase, and switches 206d and 206g activated (and switches 206a and 206e deactivated) during the second phase. In some cases, operation of hybrid 3-level buck-boost converter 200B in the forward 2:1 switched capacitor mode may be preferable to operation of hybrid 3-level buck-boost converter 200A in the forward 2:1 switched capacitor mode, as no current flows through power inductor 202 in the forward 2:1 switched capacitor mode of hybrid 3-level buck-boost converter 200B, whereas current flowing through power inductor 202 in the forward 2:1 switched capacitor mode of hybrid 3-level buck-boost converter 200A as shown in FIG. 5 may lead to losses (e.g., due to DC resistance of power inductor 202).

Figure 13:
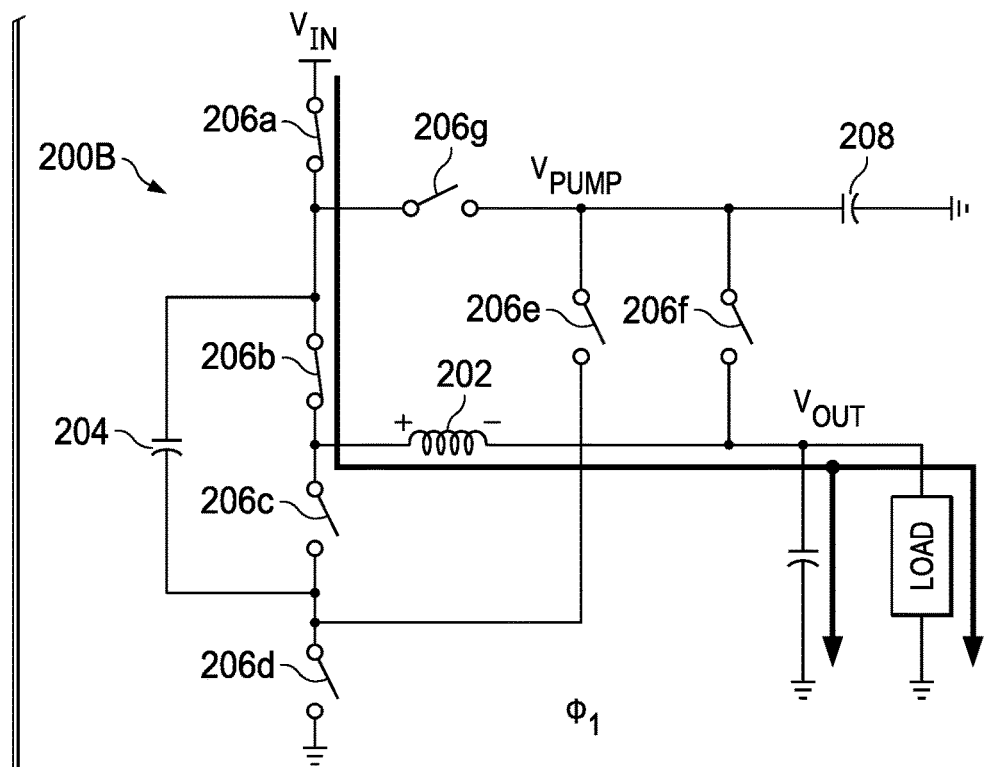
FIG. 13 illustrates operation of the hybrid 3-level buck-boost converter depicted in FIG. 9 in a forward 2-level buck mode, in accordance with embodiments of the present disclosure.
Figure 13:
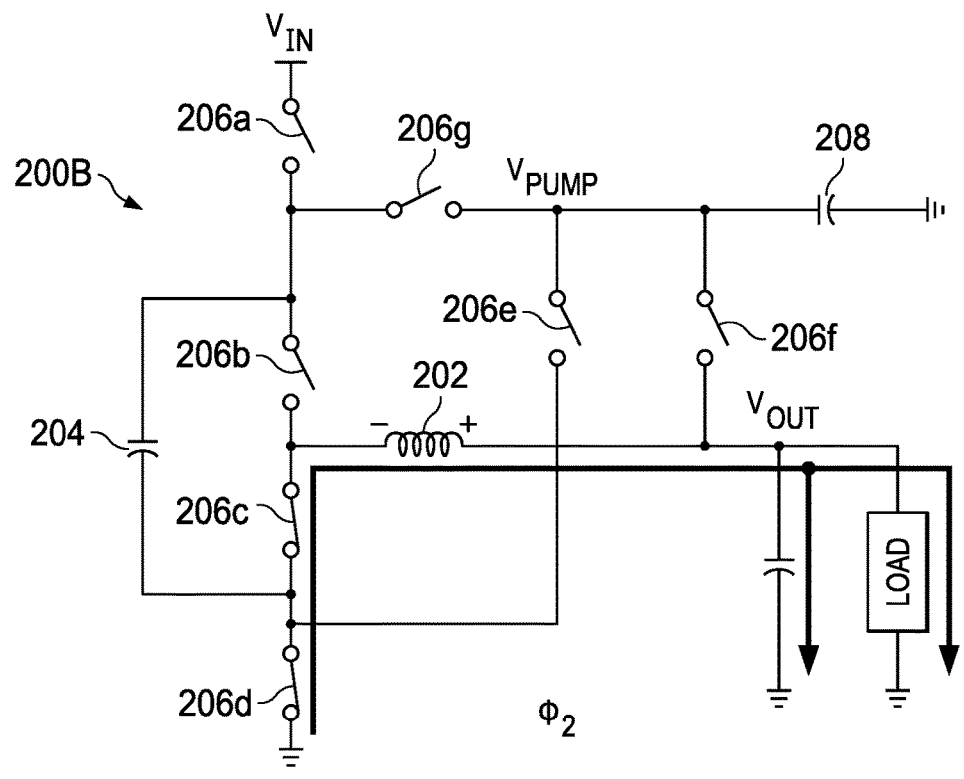

Similar to that depicted in FIG. 6, hybrid 3-level buck-boost converter 200B may operate in a forward 2-level buck mode, depicted in FIG. 13, which enables regulation of output voltage $V_{OUT}$ to a desired target voltage greater than $2V_{IN}$. As shown in FIG. 13, operation of hybrid 3-level buck-boost converter 200B in the forward 2-level buck mode may be similar to operation of hybrid 3-level buck-boost converter 200A in the forward 2-level buck mode, except that in the case of hybrid 3-level buck-boost converter 200B, switch 206g may remain deactivated during both the first phase and the second phase. Notably, by swapping the input and output of hybrid 3-level buck-boost converter 200B, hybrid 3-level buck-boost converter 200B may operate the same two phases depicted in FIG. 13 in order to operate in a reverse 2-level boost mode.

Figure 14:
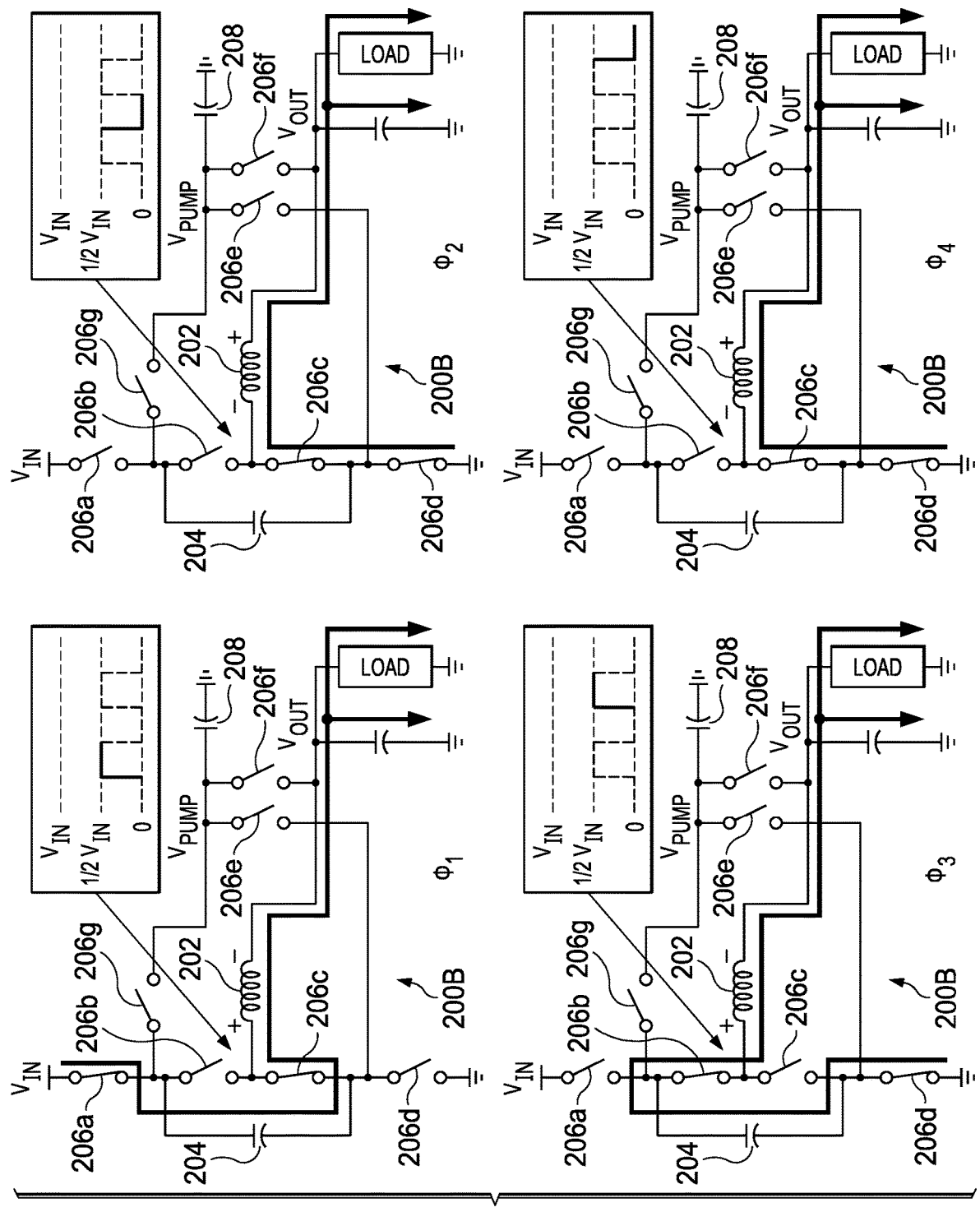
FIG. 14 illustrates operation of the hybrid 3-level buck-boost converter depicted in FIG. 9 in a forward 3-level buck mode for duty cycles less than 0.5, in accordance with embodiments of the present disclosure.
Figure 15:
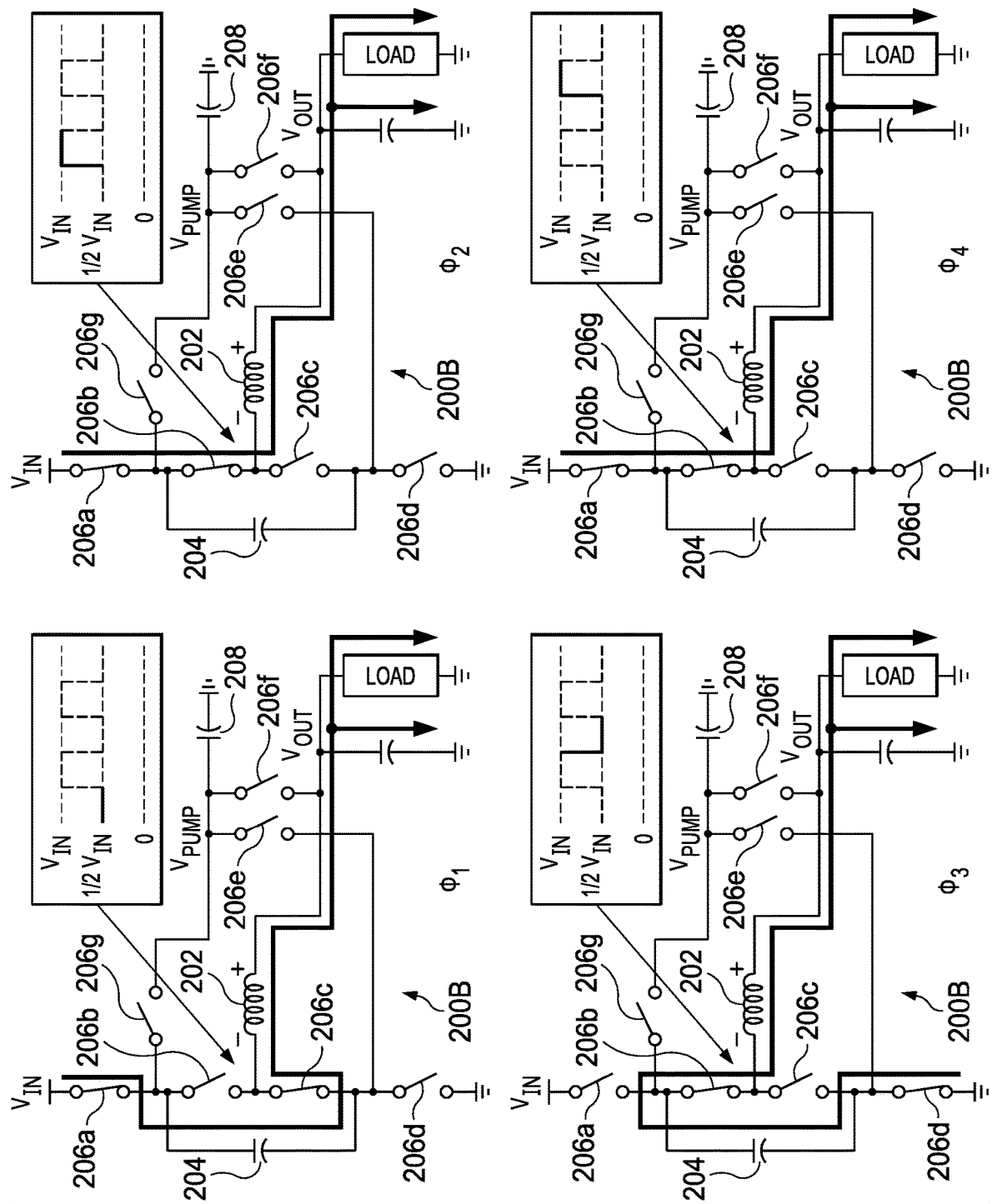
FIG. 15 illustrates operation of the hybrid 3-level buck-boost converter depicted in FIG. 9 in a forward 3-level buck mode for duty cycles greater than 0.5, in accordance with embodiments of the present disclosure.

Similar to that depicted in FIGS. 7 and 8, hybrid 3-level buck-boost converter 200B may operate in a forward 3-level buck mode, depicted in FIGS. 14 and 15. As shown in FIGS. 14 and 15, operation of hybrid 3-level buck-boost converter 200B in the forward 3-level buck mode may be similar to operation of hybrid 3-level buck-boost converter 200A in the forward 3-level buck mode, except that in the case of hybrid 3-level buck-boost converter 200B, switch 206g may remain deactivated during all four phases. Notably, by swapping the input and output of hybrid 3-level buck-boost converter 200B, hybrid 3-level buck-boost converter 200B may operate the same four phases depicted in FIGS. 14 and 15 in order to operate in a reverse 3-level boost mode.

Figure 16:
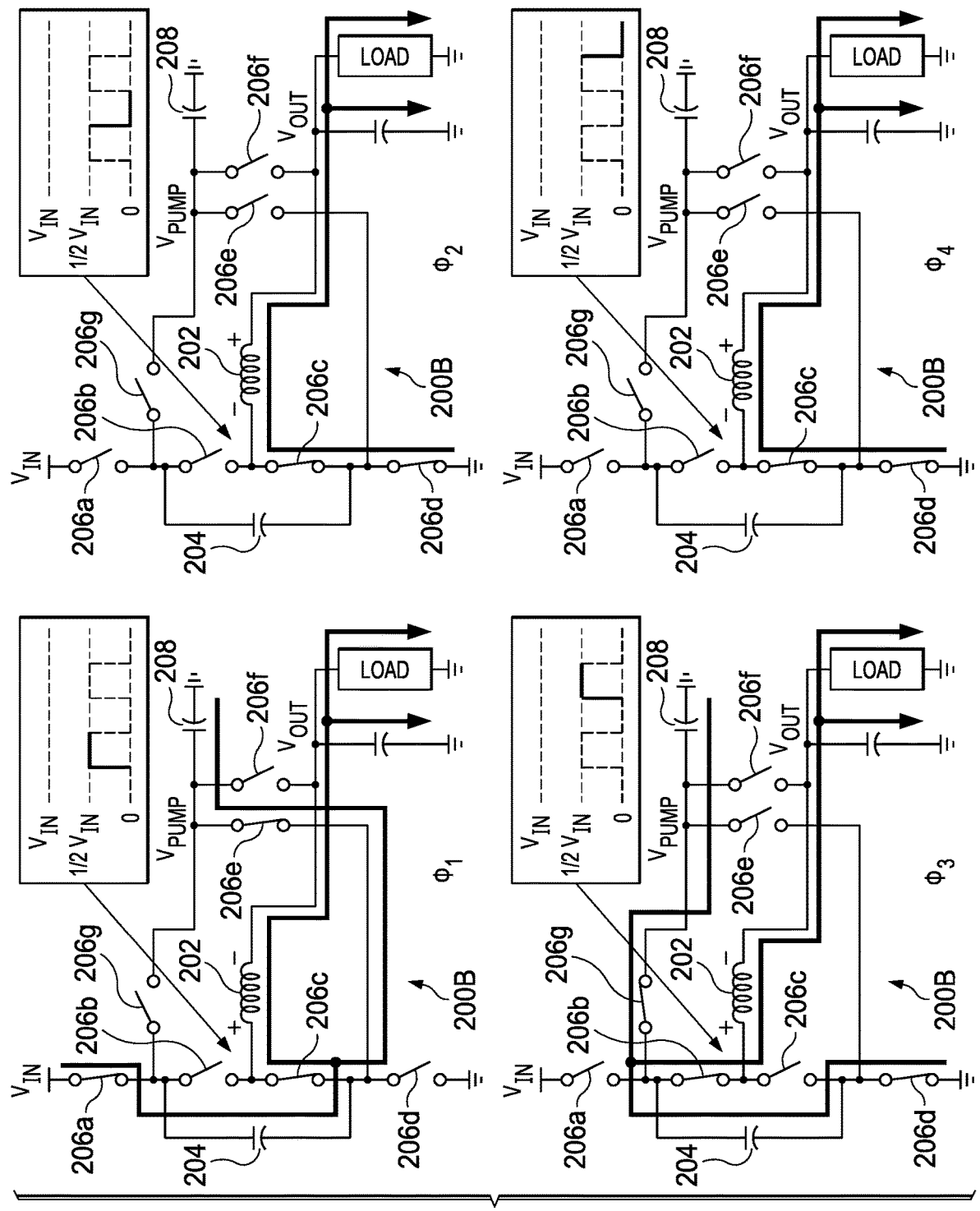
FIG. 16 illustrates operation of the hybrid 3-level buck-boost converter depicted in FIG. 9 in a forward 3-level buck mode with flying capacitor balancing for duty cycles less than 0.5, in accordance with embodiments of the present disclosure.

FIG. 16 illustrates operation of the hybrid 3-level buck-boost converter 200B in a forward 3-level buck mode with flying capacitor balancing for duty cycles less than 0.5, in accordance with embodiments of the present disclosure. Similarly, FIG. 17 illustrates operation of the hybrid 3-level buck-boost converter 200B in a forward 3-level buck mode with flying capacitor balancing for duty cycles greater than 0.5, in accordance with embodiments of the present disclosure.

Operation of hybrid 3-level buck-boost converter 200B in the flying capacitor balancing forward 3-level buck mode may be similar to operation of the forward 3-level buck mode depicted in FIG. 14. As shown in FIG. 16, for duty cycles of less than 0.5, operation in the flying capacitor balancing forward 3-level buck mode may include commutation of switches among a first phase ($\varphi1$), a second phase ($\varphi2$), a third phase ($\varphi3$), and a fourth phase ($\varphi4$). Switch 206f may remain deactivated during all four phases, and switches 206a, 206b, 206c, 206d, 206e, and 206g may be commutated to regulate output voltage $V_{OUT}$, with switches 206a, 206c, and 206e activated (and switches 206b, 206d and 206g deactivated) during the first phase, switches 206c and 206d activated (and switches 206a, 206b, 206e, and 206g deactivated) during the second phase, switches 206b, 206d, and 206g activated (and switches 206a, 206c and 206e deactivated) during the third phase, and switches 206c and 206d activated (and switches 206a, 206b, 206e, and 206g deactivated) during the fourth phase. Further, as shown in FIG. 17, for duty cycles of greater than 0.5, operation in the flying capacitor balancing forward 3-level buck mode may include commutation of switches among a first phase ($\varphi1$), a second phase ($\varphi2$), a third phase ($\varphi3$), and a fourth phase ($\varphi4$). Switch 206f may remain deactivated during all four phases, and switches 206a, 206b, 206c, 206d, 206e, and 206g may be commutated to regulate output voltage $V_{OUT}$, with switches 206a, 206c, and 206e activated (and switches 206b, 206d, and 206g deactivated) during the first phase, switches 206a and 206b activated (and switches 206c, 206d, 206e, and 206g deactivated) during the second phase, switches 206b, 206d, and 206g activated (and switches 206a, 206c, and 206e deactivated) during the third phase, and switches 206a and 206b activated (and switches 206c, 206d, 206e, and 206g deactivated) during the fourth phase. Notably, by swapping the input and output of hybrid 3-level buck-boost converter 200A, hybrid 3-level buck-boost converter 200A may operate the same four phases depicted in FIGS. 16 and 17 in order to operate in a reverse 3-level boost mode.

Figure 17:
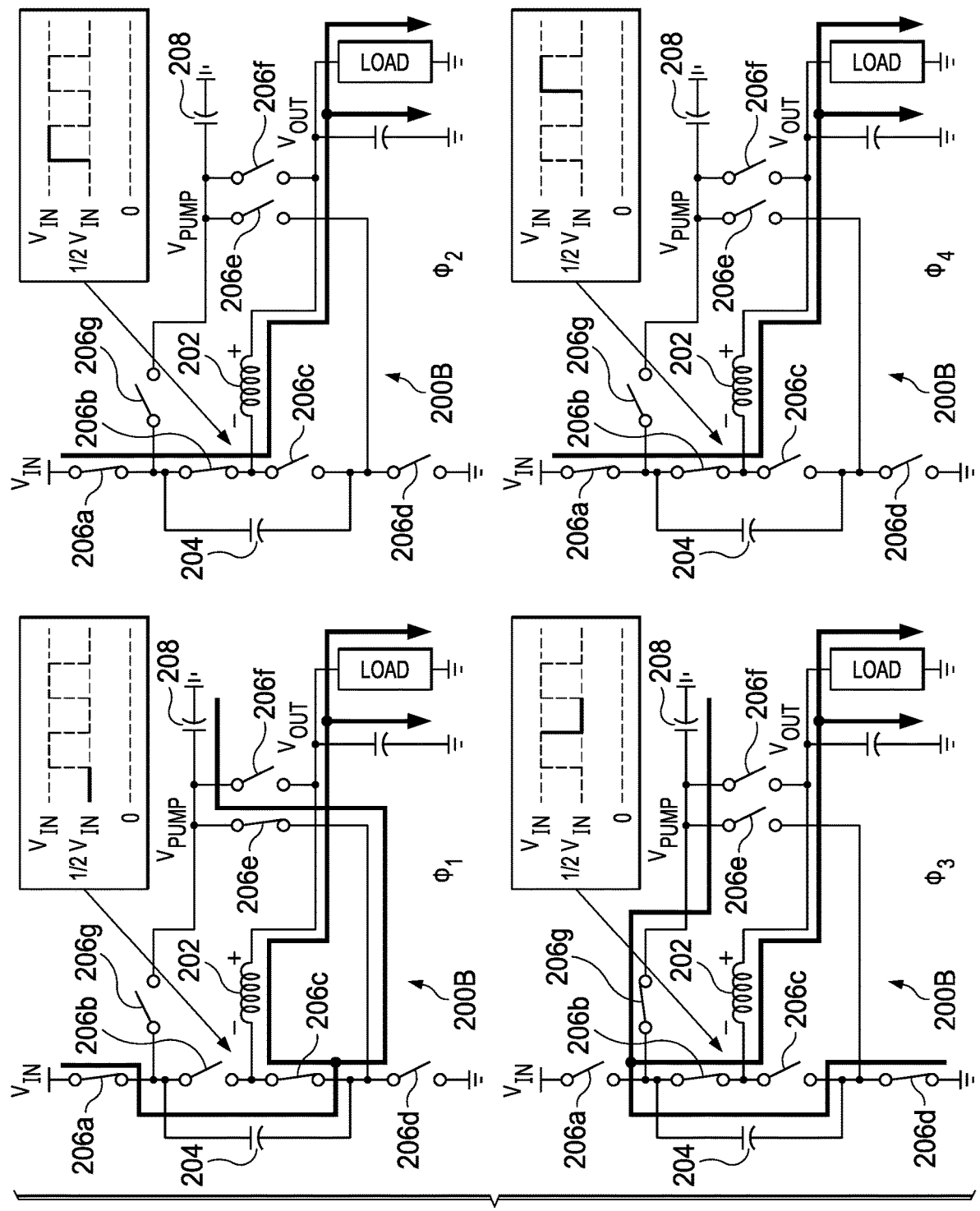
FIG. 17 illustrates operation of the hybrid 3-level buck-boost converter depicted in FIG. 9 in a forward 3-level buck mode with flying capacitor balancing for duty cycles greater than 0.5, in accordance with embodiments of the present disclosure.

A main difference between operation in the flying capacitor balancing forward 3-level buck mode of FIGS. 16 and 17 and operating in the forward 3-level buck mode of FIGS. 14 and 15, is that in the flying capacitor balancing forward 3-level buck mode, flying capacitor 204 may be coupled in series with pump capacitor 208 during the first phase (e.g., via switch 206e) and flying capacitor 204 may be coupled in parallel with pump capacitor 208 during the third phase (e.g., via switch 206g), which in turn may cause a voltage across flying capacitor 204 to remain balanced at a voltage $V_{IN}/2$.

In some embodiments, certain components of either of hybrid 3-level buck-boost converter 200A and hybrid 3-level buck-boost converter 200B may be formed within a single integrated circuit while other components may reside external to such integrated circuit. For example, in some embodiments, switches 206a, 206b, 206c, 206d, 206e, 206f, and 206g, as well as control circuitry for controlling switches 206a, 206b, 206c, 206d, 206e, 206f, and 206g, may reside on an integrated circuit, while power inductor 202, flying capacitor 204, and pump capacitor 208 are external to such integrated circuit. As another example, flying capacitor 204, pump capacitor 208, and switches 206a, 206b, 206c, 206d, 206e, 206f, and 206g, as well as control circuitry for controlling switches 206a, 206b, 206c, 206d, 206e, 206f, and 206g, may reside on an integrated circuit, while power inductor 202 resides external to such integrated circuit.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A power converter for converting an input voltage at an input of the power converter into an output voltage at an output of the power converter, the power converter comprising:
   a switching node;
   a power inductor coupled between the switching node and the output;

a flying capacitor having a first flying capacitor terminal and a second flying capacitor terminal;
a pump capacitor having a first pump capacitor terminal and a second pump capacitor terminal, the second pump capacitor terminal coupled to ground;
a first switch coupled between the input and the first flying capacitor terminal;
a second switch coupled between the first flying capacitor terminal and the switching node;
a third switch coupled between the second flying capacitor terminal and the switching node;
a fourth switch coupled between the second flying capacitor terminal and a ground voltage;
a fifth switch coupled between the second flying capacitor terminal and first pump capacitor terminal;
a sixth switch coupled between the output and the first pump capacitor terminal; and
a control circuit configured to operate the power converter in a forward hybrid boost mode having two sequential phases comprising:
a first phase in which the first switch, the second switch, the fourth switch, and the sixth switch are activated and the third switch and the fifth switch are deactivated; and
a second phase in which the second switch and the fifth switch are activated and the first switch, the third switch, the fourth switch, and the sixth switch are deactivated.

2. The power converter of claim 1, further comprising a control circuit configured to operate the power converter in a forward 2-level buck mode having two sequential phases comprising:
a first phase in which the first switch and the second switch are activated, the fifth switch and the sixth switch are deactivated, and at least one of the third switch and the fourth switch are deactivated; and
a second phase in which the third switch and the fourth switch are activated, the fifth switch and the sixth switch are deactivated, and at least one of the first switch and the second switch are deactivated.

3. The power converter of claim 1, further comprising a control circuit configured to operate the power converter in a forward 3-level buck mode having four sequential phases comprising:
for duty cycles less than 0.5:
a first phase in which the first switch and the third switch are activated and the second switch, the fourth switch, the fifth switch, and the sixth switch are deactivated;
a second phase in which the third switch and the fourth switch are activated and the first switch, the second switch, the fifth switch, and the sixth switch are deactivated;
a third phase in which the second switch and the fourth switch are activated and the first switch, the third switch, the fifth switch, and the sixth switch are deactivated; and
a fourth phase in which the third switch and the fourth switch are activated and the first switch, the second switch, the fifth switch, and the sixth switch are deactivated; and
for duty cycles greater than 0.5:
the first phase in which the first switch and the third switch are activated and the second switch, the fourth switch, the fifth switch, and the sixth switch are deactivated;
the second phase in which the first switch and the second switch are activated and the third switch, the fourth switch, the fifth switch, and the sixth switch are deactivated;
the third phase in which the second switch and the fourth switch are activated and the first switch, the third switch, the fifth switch, and the sixth switch are deactivated; and
the fourth phase in which the first switch and the second switch are activated and the third switch, the fourth switch, the fifth switch, and the sixth switch are deactivated.

4. The power converter of claim 1, further comprising a seventh switch coupled between the first flying capacitor terminal and the first pump capacitor terminal.

5. The power converter of claim 4, further comprising a control circuit configured to operate the power converter in a bypass mode wherein:
the first switch, the sixth switch, and the seventh switch are activated;
the second switch and the fifth switch are deactivated; and
at least one of the third switch and the fourth switch are deactivated.

6. The power converter of claim 4, further comprising a control circuit configured to operate the power converter in a forward 2:1 switched capacitor mode having two sequential phases comprising:
a first phase in which the first switch, the fifth switch, and the sixth switch are activated and the second switch, the third switch, the fourth switch, and the seventh switch are deactivated; and
a second phase in which the fourth switch, the sixth switch, and the seventh switch are activated and the first switch, the second switch, the third switch, and the fifth switch are deactivated.

7. The power converter of claim 4, further comprising a control circuit configured to operate the power converter in a forward 2-level buck mode having two sequential phases comprising:
a first phase in which the first switch and the second switch are activated, the fifth switch, the sixth switch, and the seventh switch are deactivated, and at least one of the third switch and the fourth switch are deactivated; and
a second phase in which the third switch and the fourth switch are activated, the fifth switch, the sixth switch, and the seventh switch are deactivated, and at least one of the first switch and the second switch are deactivated.

8. The power converter of claim 4, further comprising a control circuit configured to operate the power converter in a forward 3-level buck mode having four sequential phases comprising:
for duty cycles less than 0.5:
a first phase in which the first switch and the third switch are activated and the second switch, the fourth switch, the fifth switch, the sixth switch, and the seventh switch are deactivated;
a second phase in which the third switch and the fourth switch are activated and the first switch, the second switch, the fifth switch, the sixth switch, and the seventh switch are deactivated;
a third phase in which the second switch and the fourth switch are activated and the first switch, the third switch, the fifth switch, the sixth switch, and the seventh switch are deactivated; and a fourth phase in which the third switch and the fourth switch are activated and the first switch, the second switch, the fifth switch, the sixth switch, and the seventh switch are deactivated; and for duty cycles greater than 0.5:
the first phase in which the first switch and the third switch are activated and the second switch, the fourth switch, the fifth switch, the sixth switch, and the seventh switch are deactivated;
the second phase in which the first switch and the second switch are activated and the third switch, the fourth switch, the fifth switch, the sixth switch, and the seventh switch are deactivated;
the third phase in which the second switch and the fourth switch are activated and the first switch, the third switch, the fifth switch, the sixth switch, and the seventh switch are deactivated; and
the fourth phase in which the first switch and the second switch are activated and the third switch, the fourth switch, the fifth switch, the sixth switch, and the seventh switch are deactivated.

9. The power converter of claim 4, further comprising a control circuit configured to operate the power converter in a flying capacitor balancing forward 3-level buck mode having four sequential phases comprising:

for duty cycles less than 0.5:
a first phase in which the first switch, the third switch, and the fifth switch are activated and the second switch, the fourth switch, the sixth switch, and the seventh switch are deactivated;
a second phase in which the third switch and the fourth switch are activated and the first switch, the second switch, the fifth switch, the sixth switch, and the seventh switch are deactivated;
a third phase in which the second switch, the fourth switch, and the seventh switch are activated and the first switch, the third switch, the fifth switch, and the sixth switch are deactivated; and
a fourth phase in which the third switch and the fourth switch are activated and the first switch, the second switch, the fifth switch, the sixth switch, and the seventh switch are deactivated; and for duty cycles greater than 0.5:
the first phase in which the first switch, the third switch, and the fifth switch are activated and the second switch, the fourth switch, the sixth switch, and the seventh switch are deactivated;
the second phase in which the first switch and the second switch are activated and the third switch, the fourth switch, the fifth switch, the sixth switch, and the seventh switch are deactivated;
the third phase in which the second switch, the fourth switch, and the seventh switch are activated and the first switch, the third switch, the fifth switch, and the sixth switch are deactivated; and
the fourth phase in which the first switch and the second switch are activated and the third switch, the fourth switch, the fifth switch, the sixth switch, and the seventh switch are deactivated.

10. A power converter for converting an input voltage at an input of the power converter into an output voltage at an output of the power converter, the power converter comprising:
a switching node;
a power inductor coupled between the switching node and the output;
a flying capacitor having a first flying capacitor terminal and a second flying capacitor terminal;
a pump capacitor having a first pump capacitor terminal and a second pump capacitor terminal, the second pump capacitor terminal coupled to ground;
a first switch coupled between the input and the first flying capacitor terminal;
a second switch coupled between the first flying capacitor terminal and the switching node;
a third switch coupled between the second flying capacitor terminal and the switching node;
a fourth switch coupled between the second flying capacitor terminal and a ground voltage;
a fifth switch coupled between the second flying capacitor terminal and first pump capacitor terminal;
a sixth switch coupled between the output and the first pump capacitor terminal; and
a control circuit configured to operate the power converter in a bypass mode wherein:
the first switch and the second switch are activated;
the fifth switch and the sixth switch are deactivated; and
at least one of the third switch and the fourth switch are deactivated.

11. A power converter for converting an input voltage at an input of the power converter into an output voltage at an output of the power converter, the power converter comprising:
a switching node;
a power inductor coupled between the switching node and the output;
a flying capacitor having a first flying capacitor terminal and a second flying capacitor terminal;
a pump capacitor having a first pump capacitor terminal and a second pump capacitor terminal, the second pump capacitor terminal coupled to ground;
a first switch coupled between the input and the first flying capacitor terminal;
a second switch coupled between the first flying capacitor terminal and the switching node;
a third switch coupled between the second flying capacitor terminal and the switching node;
a fourth switch coupled between the second flying capacitor terminal and a ground voltage;
a fifth switch coupled between the second flying capacitor terminal and first pump capacitor terminal;
a sixth switch coupled between the output and the first pump capacitor terminal; and
a control circuit configured to operate the power converter in a forward 2:1 switched capacitor mode having two sequential phases comprising:
a first phase in which the first switch, the third switch, the fifth switch, and the sixth switch are activated and the second switch and the fourth switch are deactivated; and
a second phase in which the second switch, the fourth switch, and the sixth switch are activated and the first switch, the third switch, and the fifth switch are deactivated.

12. A method for converting an input voltage at an input of a power converter into an output voltage at an output of the power converter, wherein:
the power converter comprises:
a switching node;
a power inductor coupled between the switching node and the output;

a flying capacitor having a first flying capacitor terminal and a second flying capacitor terminal;

a pump capacitor having a first pump capacitor terminal and a second pump capacitor terminal, the second pump capacitor terminal coupled to ground;

a first switch coupled between the input and the first flying capacitor terminal;

a second switch coupled between the first flying capacitor terminal and the switching node;

a third switch coupled between the second flying capacitor terminal and the switching node;

a fourth switch coupled between the second flying capacitor terminal and a ground voltage;

a fifth switch coupled between the second flying capacitor terminal and first pump capacitor terminal; and a sixth switch coupled between the output and the first pump capacitor terminal; and the method comprises operating the power converter in a forward hybrid boost mode having two sequential phases comprising:

a first forward hybrid boost phase in which the first switch, the second switch, the fourth switch, and the sixth switch are activated and the third switch and the fifth switch are deactivated; and a second forward hybrid boost phase in which the second switch and the fifth switch are activated and the first switch, the third switch, the fourth switch, and the sixth switch are deactivated.

13. The method of claim 12, further comprising operating the power converter in a bypass mode wherein:

the first switch and the second switch are activated;

the fifth switch and the sixth switch are deactivated; and at least one of the third switch and the fourth switch are deactivated.

14. The method of claim 12, further comprising operating the power converter in a forward 2:1 switched capacitor mode having two sequential phases comprising:

a first phase in which the first switch, the third switch, the fifth switch, and the sixth switch are activated and the second switch and the fourth switch are deactivated; and a second phase in which the second switch, the fourth switch, and the sixth switch are activated and the first switch, the third switch, and the fifth switch are deactivated.

15. The method of claim 12, further comprising operating the power converter in a forward 2-level buck mode having two sequential phases comprising:

a first phase in which the first switch and the second switch are activated, the fifth switch and the sixth switch are deactivated, and at least one of the third switch and the fourth switch are deactivated; and a second phase in which the third switch and the fourth switch are activated, the fifth switch and the sixth switch are deactivated, and at least one of the first switch and the second switch are deactivated.

16. The method of claim 12, further comprising operating the power converter in a forward 3-level buck mode having four sequential phases comprising:

for duty cycles less than 0.5:

a first phase in which the first switch and the third switch are activated and the second switch, the fourth switch, the fifth switch, and the sixth switch are deactivated;

a second phase in which the third switch and the fourth switch are activated and the first switch, the second switch, the fifth switch, and the sixth switch are deactivated;

a third phase in which the second switch and the fourth switch are activated and the first switch, the third switch, the fifth switch, and the sixth switch are deactivated; and a fourth phase in which the third switch and the fourth switch are activated and the first switch, the second switch, the fifth switch, and the sixth switch are deactivated; and for duty cycles greater than 0.5:

the first phase in which the first switch and the third switch are activated and the second switch, the fourth switch, the fifth switch, and the sixth switch are deactivated;

the second phase in which the first switch and the second switch are activated and the third switch, the fourth switch, the fifth switch, and the sixth switch are deactivated;

the third phase in which the second switch and the fourth switch are activated and the first switch, the third switch, the fifth switch, and the sixth switch are deactivated; and the fourth phase in which the first switch and the second switch are activated and the third switch, the fourth switch, the fifth switch, and the sixth switch are deactivated.

17. The method of claim 12, wherein the power converter further comprises a seventh switch coupled between the first flying capacitor terminal and the first pump capacitor terminal.

18. The method of claim 17, further comprising operating the power converter in a forward hybrid boost mode having two sequential phases comprising:

a first phase in which the first switch, the second switch, the fourth switch, and the sixth switch are activated and the third switch, the fifth switch, and the seventh switch are deactivated; and a second phase in which the second switch and the fifth switch are activated and the first switch, the third switch, the fourth switch, the sixth switch, and the seventh switch are deactivated.

19. The method of claim 17, further comprising operating the power converter in a bypass mode wherein:

the first switch, the sixth switch, and the seventh switch are activated;

the second switch and the fifth switch are deactivated; and at least one of the third switch and the fourth switch are deactivated.

20. The method of claim 17, further comprising operating the power converter in a forward 2:1 switched capacitor mode having two sequential phases comprising:

a first phase in which the first switch, the fifth switch, and the sixth switch are activated and the second switch, the third switch, the fourth switch, and the seventh switch are deactivated; and a second phase in which the fourth switch, the sixth switch, and the seventh switch are activated and the first switch, the second switch, the third switch, and the fifth switch are deactivated.

21. The method of claim 17, further comprising operating the power converter in a forward 2-level buck mode having two sequential phases comprising:

a first phase in which the first switch and the second switch are activated, the fifth switch, the sixth switch, and the seventh switch are deactivated, and at least one of the third switch and the fourth switch are deactivated; and a second phase in which the third switch and the fourth switch are activated, the fifth switch, the sixth switch, and the seventh switch are deactivated, and at least one of the first switch and the second switch are deactivated.

22. The method of claim 17, further comprising operating the power converter in a forward 3-level buck mode having four sequential phases comprising:

for duty cycles less than 0.5:
 a first phase in which the first switch and the third switch are activated and the second switch, the fourth switch, the fifth switch, the sixth switch, and the seventh switch are deactivated;
 a second phase in which the third switch and the fourth switch are activated and the first switch, the second switch, the fifth switch, the sixth switch, and the seventh switch are deactivated;
 a third phase in which the second switch and the fourth switch are activated and the first switch, the third switch, the fifth switch, the sixth switch, and the seventh switch are deactivated; and
 a fourth phase in which the third switch and the fourth switch are activated and the first switch, the second switch, the fifth switch, the sixth switch, and the seventh switch are deactivated; and for duty cycles greater than 0.5:
 the first phase in which the first switch and the third switch are activated and the second switch, the fourth switch, the fifth switch, the sixth switch, and the seventh switch are deactivated;
 the second phase in which the first switch and the second switch are activated and the third switch, the fourth switch, the fifth switch, the sixth switch, and the seventh switch are deactivated;
 the third phase in which the second switch and the fourth switch are activated and the first switch, the third switch, the fifth switch, the sixth switch, and the seventh switch are deactivated; and
 the fourth phase in which the first switch and the second switch are activated and the third switch, the fourth switch, the fifth switch, the sixth switch, and the seventh switch are deactivated.

23. The method of claim 17, further comprising operating the power converter in a flying capacitor balancing forward 3-level buck mode having four sequential phases comprising:

for duty cycles less than 0.5:
 a first phase in which the first switch, the third switch, and the fifth switch are activated and the second switch, the fourth switch, the sixth switch, and the seventh switch are deactivated;
 a second phase in which the third switch and the fourth switch are activated and the first switch, the second switch, the fifth switch, the sixth switch, and the seventh switch are deactivated;
 a third phase in which the second switch, the fourth switch, and the seventh switch are activated and the first switch, the third switch, the fifth switch, and the sixth switch are deactivated; and
 a fourth phase in which the third switch and the fourth switch are activated and the first switch, the second switch, the fifth switch, the sixth switch, and the seventh switch are deactivated; and for duty cycles greater than 0.5:
 the first phase in which the first switch, the third switch, and the fifth switch are activated and the second switch, the fourth switch, the sixth switch, and the seventh switch are deactivated;
 the second phase in which the first switch and the second switch are activated and the third switch, the fourth switch, the fifth switch, the sixth switch, and the seventh switch are deactivated;
 the third phase in which the second switch, the fourth switch, and the seventh switch are activated and the first switch, the third switch, the fifth switch, and the sixth switch are deactivated; and
 the fourth phase in which the first switch and the second switch are activated and the third switch, the fourth switch, the fifth switch, the sixth switch, and the seventh switch are deactivated.

24. An integrated circuit for use in a power converter for converting an input voltage at an input of the integrated circuit into an output voltage at an output of the power converter, the integrated circuit comprising:
 a switching node;
 a first switch coupled between the input and a first node configured to couple to a first flying capacitor terminal of a flying capacitor;
 a second switch coupled between the first node and the switching node;
 a third switch coupled between the switching node and a second node configured to couple to a second flying capacitor terminal of the flying capacitor;
 a fourth switch coupled between the second node and a third node at a ground voltage;
 a fifth switch coupled between the second node and a fourth node configured to couple to a first pump capacitor terminal of a pump capacitor coupled to a ground voltage at a second pump capacitor terminal;
 a sixth switch coupled between the output and the fourth node; and
 a control circuit configured to operate the power converter in a forward hybrid boost mode having two sequential phases comprising:
  a first phase in which the first switch, the second switch, the fourth switch, and the sixth switch are activated and the third switch and the fifth switch are deactivated; and
  a second phase in which the second switch and the fifth switch are activated and the first switch, the third switch, the fourth switch, and the sixth switch are deactivated.

25. The integrated circuit of claim 24, further comprising a control circuit configured to operate the power converter in a bypass mode wherein:
 the first switch and the second switch are activated;
 the fifth switch and the sixth switch are deactivated; and
 at least one of the third switch and the fourth switch are deactivated.

26. The integrated circuit of claim 24, further comprising a control circuit configured to operate the power converter in a forward 2:1 switched capacitor mode having two sequential phases comprising:
 a first phase in which the first switch, the third switch, the fifth switch, and the sixth switch are activated and the second switch and the fourth switch are deactivated; and
 a second phase in which the second switch, the fourth switch, and the sixth switch are activated and the first switch, the third switch, and the fifth switch are deactivated.

27. The integrated circuit of claim 24, further comprising a control circuit configured to operate the power converter in a forward 2-level buck mode having two sequential phases comprising:
- a first phase in which the first switch and the second switch are activated, the fifth switch and the sixth switch are deactivated, and at least one of the third switch and the fourth switch are deactivated; and
- a second phase in which the third switch and the fourth switch are activated, the fifth switch and the sixth switch are deactivated, and at least one of the first switch and the second switch are deactivated.

28. The integrated circuit of claim 24, further comprising a control circuit configured to operate the power converter in a forward 3-level buck mode having four sequential phases comprising:
for duty cycles less than 0.5:
- a first phase in which the first switch and the third switch are activated and the second switch, the fourth switch, the fifth switch, and the sixth switch are deactivated;
- a second phase in which the third switch and the fourth switch are activated and the first switch, the second switch, the fifth switch, and the sixth switch are deactivated;
- a third phase in which the second switch and the fourth switch are activated and the first switch, the third switch, the fifth switch, and the sixth switch are deactivated; and
- a fourth phase in which the third switch and the fourth switch are activated and the first switch, the second switch, the fifth switch, and the sixth switch are deactivated; and for duty cycles greater than 0.5:
- the first phase in which the first switch and the third switch are activated and the second switch, the fourth switch, the fifth switch, and the sixth switch are deactivated;
- the second phase in which the first switch and the second switch are activated and the third switch, the fourth switch, the fifth switch, and the sixth switch are deactivated;
- the third phase in which the second switch and the fourth switch are activated and the first switch, the third switch, the fifth switch, and the sixth switch are deactivated; and
- the fourth phase in which the first switch and the second switch are activated and the third switch, the fourth switch, the fifth switch, and the sixth switch are deactivated.

29. The integrated circuit of claim 24, further comprising a seventh switch coupled between the first node and the fourth node.

30. The integrated circuit of claim 29, further comprising a control circuit configured to operate the power converter in a bypass mode wherein:
- the first switch, the sixth switch, and the seventh switch are activated;
- the second switch and the fifth switch are deactivated; and
- at least one of the third switch and the fourth switch are deactivated.

31. The integrated circuit of claim 29, further comprising a control circuit configured to operate the power converter in a forward 2:1 switched capacitor mode having two sequential phases comprising:
- a first phase in which the first switch, the fifth switch, and the sixth switch are activated and the second switch, the third switch, the fourth switch, and the seventh switch are deactivated; and
- a second phase in which the fourth switch, the sixth switch, and the seventh switch are activated and the first switch, the second switch, the third switch, and the fifth switch are deactivated.

32. The integrated circuit of claim 29, further comprising a control circuit configured to operate the power converter in a forward 2-level buck mode having two sequential phases comprising:
- a first phase in which the first switch and the second switch are activated, the fifth switch, the sixth switch, and the seventh switch are deactivated, and at least one of the third switch and the fourth switch are deactivated; and
- a second phase in which the third switch and the fourth switch are activated, the fifth switch, the sixth switch, and the seventh switch are deactivated, and at least one of the first switch and the second switch are deactivated.

33. The integrated circuit of claim 29, further comprising a control circuit configured to operate the power converter in a forward 3-level buck mode having four sequential phases comprising:
for duty cycles less than 0.5:
- a first phase in which the first switch and the third switch are activated and the second switch, the fourth switch, the fifth switch, the sixth switch, and the seventh switch are deactivated;
- a second phase in which the third switch and the fourth switch are activated and the first switch, the second switch, the fifth switch, the sixth switch, and the seventh switch are deactivated;
- a third phase in which the second switch and the fourth switch are activated and the first switch, the third switch, the fifth switch, the sixth switch, and the seventh switch are deactivated; and
- a fourth phase in which the third switch and the fourth switch are activated and the first switch, the second switch, the fifth switch, the sixth switch, and the seventh switch are deactivated; and for duty cycles greater than 0.5:
- the first phase in which the first switch and the third switch are activated and the second switch, the fourth switch, the fifth switch, the sixth switch, and the seventh switch are deactivated;
- the second phase in which the first switch and the second switch are activated and the third switch, the fourth switch, the fifth switch, the sixth switch, and the seventh switch are deactivated;
- the third phase in which the second switch and the fourth switch are activated and the first switch, the third switch, the fifth switch, the sixth switch, and the seventh switch are deactivated; and
- the fourth phase in which the first switch and the second switch are activated and the third switch, the fourth switch, the fifth switch, the sixth switch, and the seventh switch are deactivated.

34. The integrated circuit of claim 29, further comprising a control circuit configured to operate the power converter in a flying capacitor balancing forward 3-level buck mode having four sequential phases comprising:
for duty cycles less than 0.5:
- a first phase in which the first switch, the third switch, and the fifth switch are activated and the second switch, the fourth switch, the sixth switch, and the seventh switch are deactivated;

a second phase in which the third switch and the fourth switch are activated and the first switch, the second switch, the fifth switch, the sixth switch, and the seventh switch are deactivated;

a third phase in which the second switch, the fourth switch, and the seventh switch are activated and the first switch, the third switch, the fifth switch, and the sixth switch are deactivated; and a fourth phase in which the third switch and the fourth switch are activated and the first switch, the second switch, the fifth switch, the sixth switch, and the seventh switch are deactivated; and for duty cycles greater than 0.5:

the first phase in which the first switch, the third switch, and the fifth switch are activated and the second switch, the fourth switch, the sixth switch, and the seventh switch are deactivated;

the second phase in which the first switch and the second switch are activated and the third switch, the fourth switch, the fifth switch, the sixth switch, and the seventh switch are deactivated;

the third phase in which the second switch, the fourth switch, and the seventh switch are activated and the first switch, the third switch, the fifth switch, and the sixth switch are deactivated; and the fourth phase in which the first switch and the second switch are activated and the third switch, the fourth switch, the fifth switch, the sixth switch, and the seventh switch are deactivated.

\* \* \* \* \*